(12) United States Patent
Tan et al.

(10) Patent No.: US 12,299,323 B2
(45) Date of Patent: May 13, 2025

(54) MEMORY CONTROLLER AND MEMORY SYSTEM PERFORMING WEAR-LEVELING

(71) Applicant: YANGTZE MEMORY TECHNOLOGIES CO., LTD., Wuhan (CN)

(72) Inventors: Hua Tan, Wuhan (CN); Xing Wang, Wuhan (CN); Yaolong Gao, Wuhan (CN); Fanya Bi, Wuhan (CN); Zhe Sun, Wuhan (CN); Bo Yu, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 14 days.

(21) Appl. No.: 18/199,246

(22) Filed: May 18, 2023

(65) Prior Publication Data
US 2024/0361955 A1    Oct. 31, 2024

Related U.S. Application Data

(63) Continuation of application No. PCT/CN2023/091251, filed on Apr. 27, 2023.

(51) Int. Cl.
*G06F 3/06* (2006.01)
*G06F 12/02* (2006.01)

(52) U.S. Cl.
CPC .......... *G06F 3/0658* (2013.01); *G06F 3/0614* (2013.01); *G06F 3/0679* (2013.01); *G06F 12/0238* (2013.01); *G06F 2212/7211* (2013.01)

(58) Field of Classification Search
CPC .... G06F 3/0658; G06F 3/0614; G06F 3/0679; G06F 12/0238; G06F 2212/7211
See application file for complete search history.

(56) References Cited

U.S. PATENT DOCUMENTS

| | | | |
|---|---|---|---|
| 10,705,953 B2 * | 7/2020 | Hu | G06F 3/0649 |
| 2016/0011799 A1 * | 1/2016 | Yu | G06F 3/0616 |
| | | | 711/103 |
| 2019/0107957 A1 | 4/2019 | Helmick et al. | |
| 2022/0083273 A1 | 3/2022 | Saito | |

OTHER PUBLICATIONS

International Search Report issued in corresponding International Application No. PCT/CN2023/091251, mailed Oct. 2, 2023, 3 pages.

* cited by examiner

*Primary Examiner* — Jae U Yu

(74) *Attorney, Agent, or Firm* — BAYES PLLC

(57) ABSTRACT

In certain aspects, a memory system includes a non-volatile memory device and a memory controller coupled to the non-volatile memory device. The non-volatile memory device includes a plurality of memory groups. Each of the memory groups includes a plurality of memory units. The memory controller is configured to perform at least one of a first wear-leveling process by swapping a first memory group of the memory groups and a second memory group of the memory groups based on a first group write count for the first memory group and a second group write count for the second memory group, or a second wear-leveling process by swapping a first memory unit of the memory units and a second memory unit of the memory units based on a first unit write count for the first memory unit and a second unit write count for the second memory unit.

19 Claims, 18 Drawing Sheets

| LOGICAL BLOCK ADDRESS | PHYSICAL BLOCK ADDRESS |
|---|---|
| 0 | 0 |
| 1 | 1 |
| 2 | 2 |
| ... | ... |
| M | M |
| ... | ... |
| N | N |
| ... | ... |

FIG. 9A

| LOGICAL BLOCK ADDRESS | PHYSICAL BLOCK ADDRESS |
|---|---|
| 0 | 0 |
| 1 | 1 |
| 2 | 2 |
| ... | ... |
| M | N |
| ... | ... |
| N | M |
| ... | ... |

FIG. 9B

| LOGICAL CW ADDRESS | PHYSICAL CW ADDRESS |
|---|---|
| 0 | 0 |
| 1 | 1 |
| 2 | 2 |
| ... | ... |
| M | M |
| ... | ... |
| N | N |
| ... | ... |

FIG. 10A

| LOGICAL CW ADDRESS | PHYSICAL CW ADDRESS |
|---|---|
| 0 | 0 |
| 1 | 1 |
| 2 | 2 |
| ... | ... |
| M | N |
| ... | ... |
| N | M |
| ... | ... |

FIG. 10B

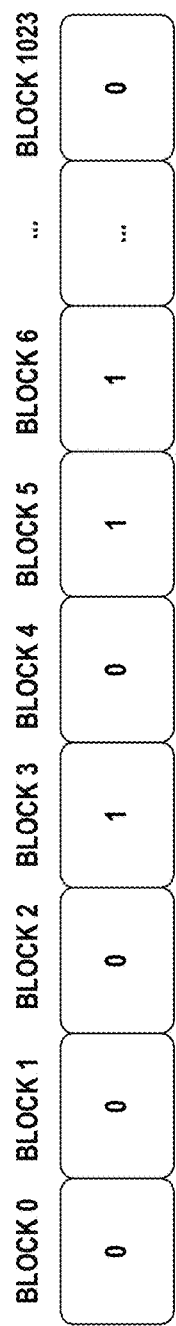

MEMORY CONTROLLER AND MEMORY SYSTEM PERFORMING WEAR-LEVELING

CROSS-REFERENCE TO RELATED APPLICATIONS

This application is a continuation of International Application No. PCT/CN2023/091251, filed on Apr. 27, 2023, and entitled "MEMORY CONTROLLER AND MEMORY SYSTEM PERFORMING WEAR-LEVELING," which is incorporated by reference herein in its entirety.

BACKGROUND

The present disclosure relates to memory devices and operation methods thereof.

Storage class memory (SCM) is a type of non-volatile memory that bridges the gap between traditional volatile memory, such as dynamic random-access memory (DRAM), and non-volatile storage, such as NAND Flash or hard disk drives. SCM combines the advantages of both types, providing low-latency, high-speed data access similar to DRAM, along with the persistence and higher capacity typically found in non-volatile storage. SCM is increasingly being adopted in data centers and other high-performance computing environments, where they help reduce latency, improve overall system efficiency, and provide more effective data management solutions.

SUMMARY

In one aspect, a memory system includes a non-volatile memory device and a memory controller coupled to the non-volatile memory device. The non-volatile memory device includes a plurality of memory groups. Each of the memory groups includes a plurality of memory units. The memory controller is configured to perform at least one of a first wear-leveling process by swapping a first memory group of the memory groups and a second memory group of the memory groups based on a first group write count for the first memory group and a second group write count for the second memory group, or a second wear-leveling process by swapping a first memory unit of the memory units and a second memory unit of the memory units based on a first unit write count for the first memory unit and a second unit write count for the second memory unit.

In some implementations, each of the memory units corresponds to a codeword.

In some implementations, the memory controller is configured to swap the first memory group and the second memory group by swapping data of the first memory group and data of the second memory group, and swapping a first physical group address of the first memory group and a second physical group address of the second memory group.

In some implementations, to read the M data pages, the peripheral circuit comprises a word line driver coupled to the select row through a select word line of the word lines, and configured to apply an adjusted read voltage between the two threshold voltage ranges to the select word line.

In some implementations, the memory controller is configured to swap the first memory unit and the second memory unit by swapping data of the first memory unit and data of the second memory unit, and swapping a first physical unit address of the first memory unit and a second physical unit address of the second memory unit.

In some implementations, the memory system further includes a volatile memory device. In some implementations, the memory controller is configured to monitor a group write count for each memory group of the non-volatile memory device, and store the group write counts into the volatile memory device. In some implementations, the first group write count of the group counts for the first memory group is a maximal group write count of the group write counts, and the second group write count of the group write counts for the second memory group is a minimal group write count of the group write counts.

In some implementations, the group write count for each memory group of the non-volatile memory device is an average unit write count of the memory units in the memory group.

In some implementations, the memory controller is configured to perform the first wear-leveling process in response to a difference between the first group write count and the second group write count being larger than a group count threshold.

In some implementations, the memory controller is configured to decrease the first group write count for the first memory group by a preset value after the first wear-leveling process.

In some implementations, the memory controller is configured to increase the second group write count for the second memory group by a preset value after the first wear-leveling process.

In some implementations, the memory controller is configured to store a group mapping table between a logical group address and a physical group address of each memory group into the volatile memory device. In some implementations, for each memory group, the logical group address and the physical group address are the same before the first wear-leveling process.

In some implementations, the memory controller is configured to update the group mapping table after the first wear-leveling process by swapping the first physical group address of the first memory group and the second physical group address of the second memory group.

In some implementations, the memory controller is configured to monitor a unit write count for each memory unit of the non-volatile memory device, and store the unit write counts into the non-volatile memory device. In some implementations, the first unit write count of the unit write counts for the first memory unit is a maximal unit write count of the unit write counts, and the second unit write count of the unit write counts for the second memory unit is a minimal unit write count of the unit write counts.

In some implementations, the memory controller is configured to perform the second wear-leveling process in response to a difference between the first unit write count and the second unit write count being larger than a unit count threshold.

In some implementations, the memory controller is configured to decrease the first unit write count for the first memory unit by a preset value after the second wear-leveling process.

In some implementations, the memory controller is configured to increase the second unit write count for the second memory unit by a preset value after the second wear-leveling process.

In some implementations, the memory controller is configured to, for each memory group, store a unit mapping table between a logical unit address and a physical unit address of each memory unit in the memory group into the non-volatile memory device. In some implementations, for each memory unit, the logical unit address and the physical unit address are the same before the second wear-leveling process.

In some implementations, the memory controller is configured to update the unit mapping table after the second wear-leveling process by swapping the first physical unit address of the first memory unit and the second physical unit address of the second memory unit.

In some implementations, the memory controller is further configured to store a swap bitmap into the volatile memory device, the swap bitmap indicating a swapping index of each memory group of the non-volatile memory device.

In some implementations, the swapping index of the memory group is a default value in response to no second wear-leveling process being performed for the first and second memory units in the memory group. In some implementations, the swapping index of the memory group is a swapping value in response to the second wear-leveling process being performed for the first and second memory units in the memory group.

In some implementations, the memory controller is configured to in response to the swapping index of the memory group being the swapping value, retrieve the unit mapping table of the memory group from the non-volatile memory device, and store the unit mapping table into the volatile memory device.

In some implementations, each memory unit of the memory units comprises SCM cells.

In another aspect, a method for operating a non-volatile memory device is provided. The non-volatile memory device includes a plurality of memory groups. Each of the memory groups includes a plurality of memory units. At least one of (i) a first wear-leveling process by swapping a first memory group of the memory groups and a second memory group of the memory groups based on a first group write count for the first memory group and a second group write count for the second memory group, or (ii) a second wear-leveling process by swapping a first memory unit of the memory units and a second memory unit of the memory units based on a first unit write count for the first memory unit and a second unit write count for the second memory unit is performed.

In some implementations, each of the memory units corresponds to a codeword.

In some implementations, to swap the first memory group and the second memory group, data of the first memory group and data of the second memory group are swapped, and a first physical group address of the first memory group and a second physical group address of the second memory group are swapped.

In some implementations, to swap the first memory unit and the second memory unit, data of the first memory unit and data of the second memory unit are swapped, and a first physical unit address of the first memory unit and a second physical unit address of the second memory unit are swapped.

In some implementations, a group write count for each memory group of the non-volatile memory device is monitored, and the group write counts are stored into a volatile memory device. In some implementations, the first group write count of the group write counts for the first memory group is a maximal group write count of the group write counts, and the second group write count of the group write counts for the second memory group is a minimal group write count of the group write counts.

In some implementations, the group write count for each memory group of the non-volatile memory device is an average unit write count of the memory units in the memory group.

In some implementations, the first wear-leveling process is performed in response to a difference between the first group write count and the second group write count being larger than a group count threshold.

In some implementations, the first group write count for the first memory group is decreased by a preset value after the first wear-leveling process.

In some implementations, the second group write count for the second memory group is increased by a preset value after the first wear-leveling process.

In some implementations, a group mapping table between a logical group address and a physical group address of each memory group is stored into the volatile memory device. In some implementations, for each memory group, the logical group address and the physical group address are the same before the first wear-leveling process.

In some implementations, the group mapping table is updated after the first wear-leveling process by swapping the first physical group address of the first memory group and the second physical group address of the second memory group.

In some implementations, a unit write count for each memory unit of the non-volatile memory device is monitored, and the unit write counts are stored into the non-volatile memory device. In some implementations, the first unit write count of the unit write counts for the first memory unit is a maximal unit write count of the unit write counts, and the second unit count of the unit write counts for the second memory unit is a minimal unit write count of the unit write counts.

In some implementations, the second wear-leveling process is performed in response to a difference between the first unit write count and the second unit write count being larger than a unit count threshold.

In some implementations, the first unit write count for the first memory unit is decreased by a preset value after the second wear-leveling process.

In some implementations, the second unit write count for the second memory unit is increased by a preset value after the second wear-leveling process.

In some implementations, for each memory group, a unit mapping table between a logical unit address and a physical unit address of each memory unit in the memory group is stored into the non-volatile memory device. In some implementations, for each memory unit, the logical unit address and the physical unit address are the same before the second wear-leveling process.

In some implementations, the unit mapping table is updated after the second wear-leveling process by swapping the first physical unit address of the first memory unit and the second physical unit address of the second memory unit.

In some implementations, a swap bitmap is stored into the volatile memory device. In some implementations, the swap bitmap indicates a swapping index of each memory group of the non-volatile memory device.

In some implementations, the swapping index of the memory group is a default value in response to no second wear-leveling process being performed for the first and second memory units in the memory group.

In some implementations, the swapping index of the memory group is a swapping value in response to the second wear-leveling process being performed for the first and second memory units in the memory group.

In some implementations, in response to the swapping index of the memory group being the swapping value, the unit mapping table of the memory group is retrieved from the non-volatile memory device, and the unit mapping table is stored into the volatile memory device.

In still another aspect, a non-transitory computer-readable storage medium is provided. The non-transitory computer-readable storage medium includes instructions that, when executed by a memory controller, cause the memory controller to perform at least one of (i) a first wear-leveling process by swapping a first memory group of a non-volatile memory device and a second memory group of the non-volatile memory device based on a first group write count for the first memory group and a second group write count for the second memory group, each of the first and second memory groups including a plurality of memory units, or (ii) a second wear-leveling process by swapping a first memory unit of the memory units and a second memory unit of the memory units based on a first unit write count for the first memory unit and a second unit write count for the second memory unit.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIGS. 9A and 9B illustrate an L2P block table before and after performing block-level wear-leveling, respectively, according to some aspects of the present disclosure.

FIGS. 10A and 10B illustrate an L2P codeword table before and after performing codeword-level wear-leveling, respectively, according to some aspects of the present disclosure.

FIG. 11 illustrates a swap bitmap, according to some aspects of the present disclosure.

The present disclosure will be described with reference to the accompanying drawings.

DETAILED DESCRIPTION

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Data types, such as hot data, warm data, and cold data, will impact the endurance of the storage products. Hot data will stress the media with the high program/erase (P/E) cycle, while cold will protect the media with a low P/E cycle in the storage products, like NAND Flash-based embedded multimedia card (eMMC), universal flash storage (UFS), and solid-state drive (SSD) system. How to stress all the physical resources uniformly is dealt with by the wear-leveling algorithms in the storage products. Wear-leveling is a technique used to ensure an even distribution of P/E cycles across all physical resources (e.g., memory blocks). This is important because memory cells in storage products have a limited number of P/E cycles they can endure before their reliability degrades or they become unusable. Wear-leveling algorithms work by tracking the number of P/E cycles performed on each memory block and attempting to distribute the write and erase operations evenly across all blocks. When data needs to be written or updated, the wear-leveling algorithm chooses a block with a lower wear count (i.e., fewer P/E cycles) to help balance the wear across the memory device.

Figure 16:
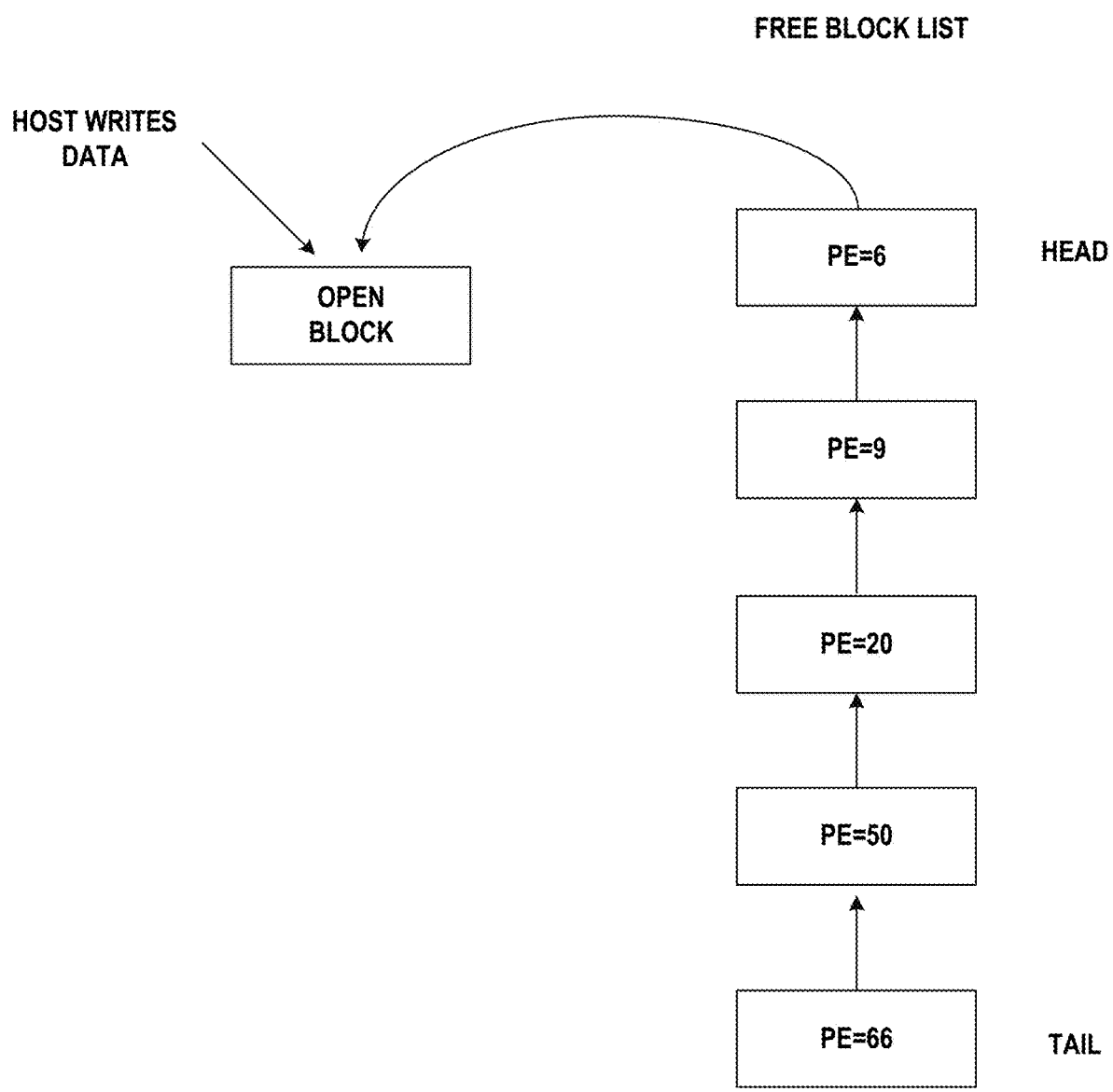
FIG. 16 illustrates a scheme of dynamic wear-leveling.
Figure 17:
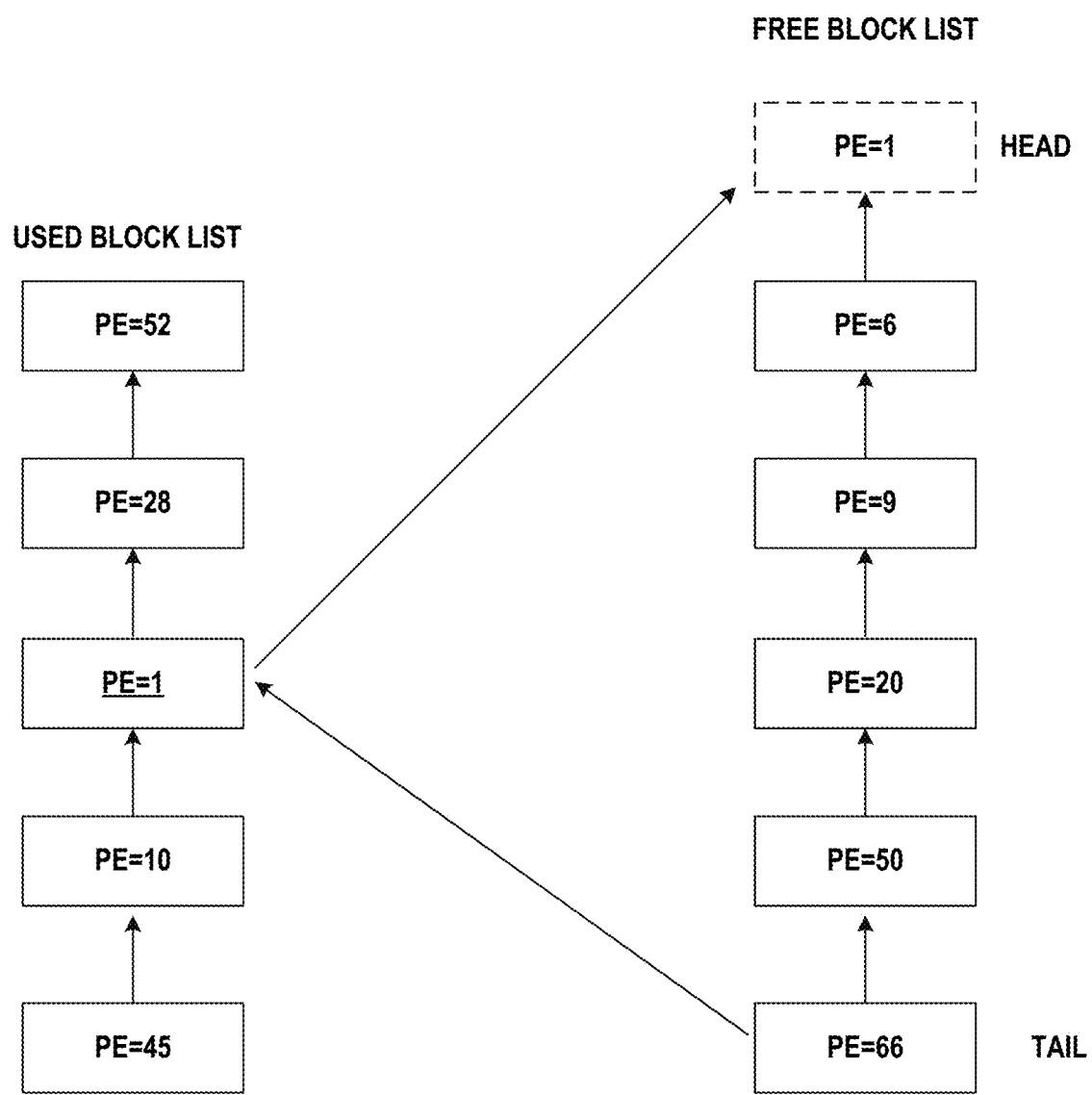
FIG. 17 illustrates a scheme of static wear-leveling.

In the current wear-leveling algorithms, the memory system doesn't know the data type of the host writing data (e.g., hot, warm, or cold data) if the host doesn't notify the data type. For example, in the NAND Flash system, the memory controller will record the P/E life cycle of each physical block. The memory controller will then perform either the dynamic wear-leveling by using the free blocks with the smaller P/E life cycle, or the static wear leveling by swapping data in the younger physical block (having a smaller P/E count) to the older physical block (having a larger P/E count) and releasing the younger block to use when the P/E life cycle gap is large enough. For example, as shown in FIG. 16, under the scheme of dynamic wear-leveling, the free block list is ranked with P/E count from head (e.g., PE=6) to tail (e.g., PE=66), such that the head with the smallest P/E cycle is always used as the open block to write host data regardless of the data type (e.g., hot, warm, or cold data). As shown in FIG. 17, under the scheme of static wear-leveling, when the P/E life cycle gap (e.g., the largest P/E cycle minus the smallest P/E cycle) becomes larger than the threshold, the youngest used block with data (e.g., PE=1) is released as the head of the free block list, and the data therein is copied to the tail of the free block list with the largest P/E cycle (e.g., PE=66).

Figure 18:
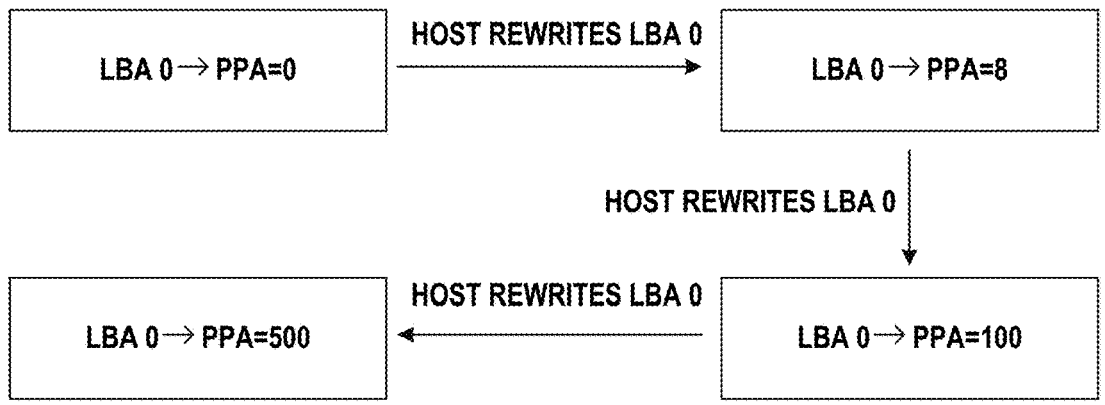
FIG. 18 illustrates a scheme for updating a logical-to-physical (L2P) table used for NAND Flash.

Nevertheless, in the current wear-leveling algorithms, the memory controller does not use different schemes to handle different types (e.g., hotness) of data, but instead, just handles the consequence large P/E life cycle gap from the different types of data because there are limitations on block erase and page program and read. For example, for NAND Flash storage products, data cannot be rewritten to the same physical page without block erasing. As shown in FIG. 18, when the host writes data using the same logical block address (LBA, e.g., LBA 0), the data will be rewritten to different physical page addresses (PPAs, e.g., PPA=0, PPA=8, PPA=100, PPA=500). Since the LBAs and PPAs do not have a fixed relationship, the program/write cycle counts (a.k.a. write count) of physical addresses are different from those of logical addresses known by the memory controller. Thus, the write count cannot be used as the indicator of the hotness of host data.

To address one or more of the aforementioned issues, the present disclosure introduces a two-level wear-leveling scheme based on the write counts of physical resources at different granularities to increase the endurance of the storage products. In some implementations, since the write counts can reflect the hotness of host data in SCM products, better endurance of the SCM products can be achieved using the wear-leveling schemes disclosed herein that take into account the hotness of host data. In some implementations, the write counts of physical resources at different granularities (e.g., physical codewords, blocks, etc.) can be used by wear-leveling schemes at the corresponding levels to achieve more precise management on the wear-leveling, thereby stressing the SCM more uniformly. In some implementations, swap bitmap and L2P mapping tables at different levels are introduced to manage the data swap relationship in wear-leveling.

Figure 1:
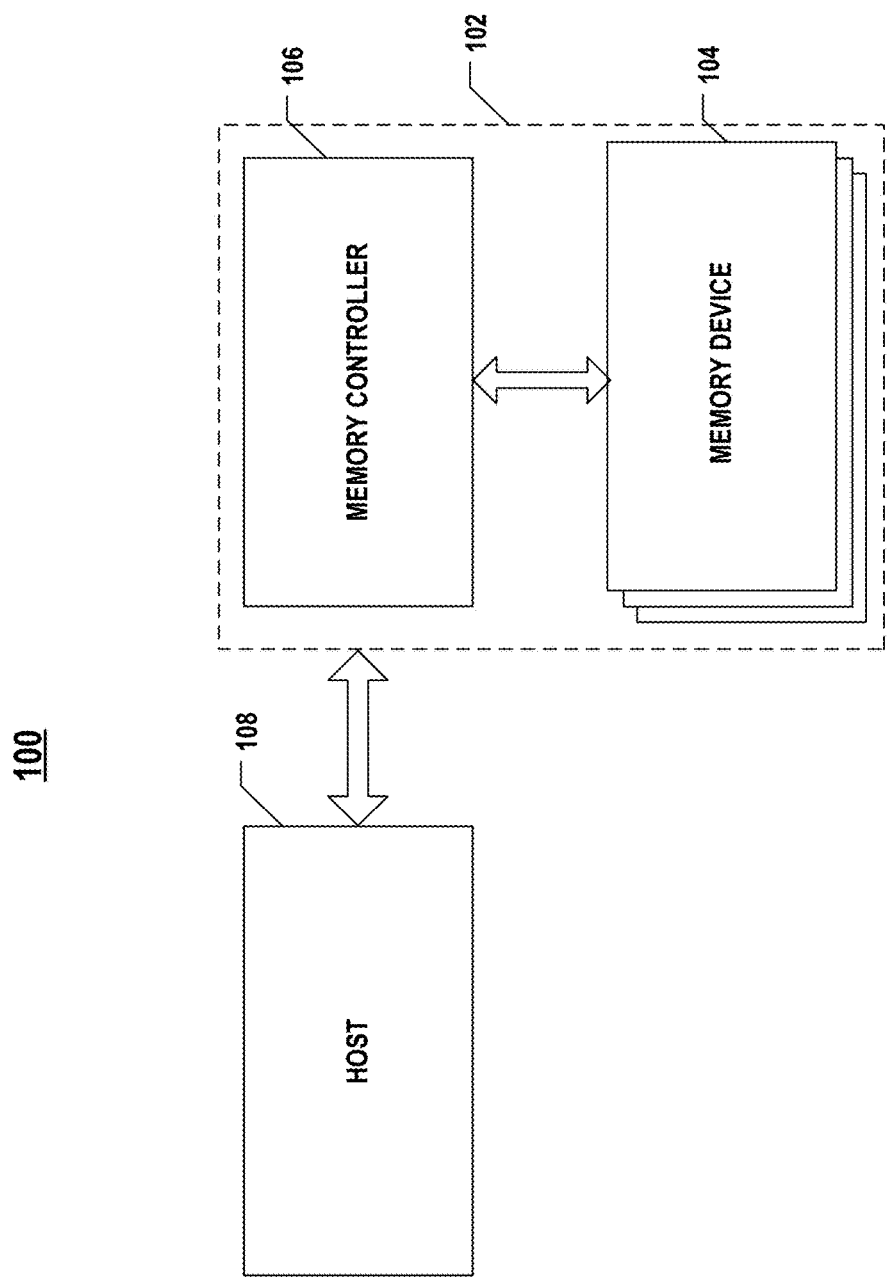
FIG. 1 illustrates a block diagram of a system including a memory system, according to some aspects of the present disclosure.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data (a.k.a. user data or host data) to or from memory system 102. Memory system 102 can be a storage product integrating memory controller 106 and one or more memory devices 104, such as an SCM system.

Memory devices 104 can be any memory devices disclosed in the present disclosure, including non-volatile memory devices, such as SCM devices. In some implementations, memory device 104 also includes one or more volatile memory devices, such as DRAM devices or static random-access memory (SRAM) devices.

Memory controller 106 is coupled to memory devices 104 and host 108 and is configured to control memory devices 104, according to some implementations. Memory controller 106 can manage the data stored in memory devices 104 and communicate with host 108. In some implementations, memory controller 106 is designed for operating in a high duty-cycle environment SSDs or eMMCs used as data storage for mobile devices, such as smartphones, tablets, laptop computers, etc., and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, L2P address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Consistent with the scope of the present disclosure and disclosed below in detail, memory controller 106 can be configured to perform block-level wear-leveling based on block-level write counts, and/or codeword-level wear-leveling based on codeword-level write counts. To facilitate the write count-based wear-leveling at different levels, memory controller 106 is also configured to manage various data structures, such as L2P mapping tables at different levels and a swap bitmap, according to some implementations.

Figure 2:
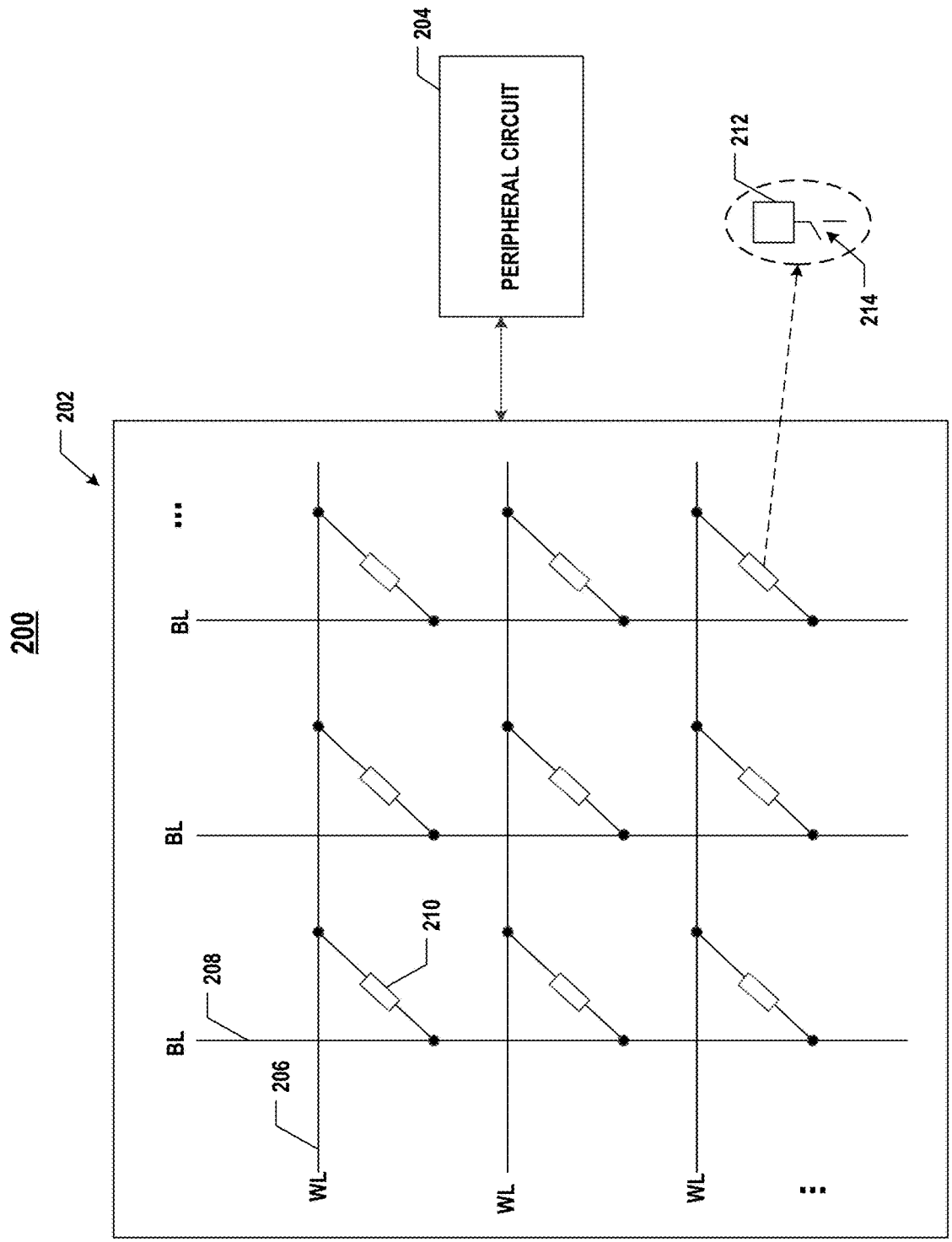
FIG. 2 illustrates a schematic diagram of an SCM device, according to some aspects of the present disclosure.

FIG. 2 illustrates a schematic diagram of an SCM device 200, according to some aspects of the present disclosure. SCM device 200 may be one example of memory device 104 in FIG. 1. SCM device 200 can include an SCM cell array 202 and peripheral circuits 204 coupled to SCM cell array 202. SCM cell array 202 can include word lines (WLs) 206, bit lines (BLs) 208, and SCM cells 210 at intersections between word lines 206 and bit lines 208. In some implementations, each SCM cell 210 includes an SCM element 212 in series with an access device 214 (a.k.a. selector). SCM element 212 can be configured to store binary data (e.g., 0 and 1) persistently, for example, by holding a continuous, analog value, such as an electrical voltage or charge, even when the power supply is interrupted or turned off. SCM element 212 includes, but not limited to, PCM elements, resistive memory elements, magnetoresistive memory elements, ferroelectric memory elements, spin-transfer torque (STT) memory elements, etc., according to some implementations. Access device 214 can be configured to control access of the corresponding SCM element 212 by peripheral circuits 204. Access device 214 includes, but not limited to, transistors, diodes, ovonic threshold switches (OTSs), mixed ionic-electronic conductors (MIECs), conductive oxide tunnel barriers, etc., according to some implementations.

As shown in FIG. 2, SCM cell array 202 can include an array of SCM cells 210 in rows and columns. The rows of SCM cells 210 can be respectively coupled to word lines 206, and the columns of SCM cells 210 can be respectively coupled to bit lines 208. Peripheral circuits 204 can be coupled to SCM cell array 202 through bit lines 208 and word lines 206.

Peripheral circuits 204 can include any suitable analog, digital, and mixed-signal circuits for facilitating the operations of SCM cell array 202 by applying and sensing voltage signals and/or current signals to and from SCM cells 210 through bit lines 208 and word lines 206. Peripheral circuits 204 can include various types of peripheral circuits formed using metal-oxide-semiconductor (MOS) technologies.

It is understood that depending on the underlying memory technologies that form SCM elements 212, SCM device 200 may include any suitable types of SCM devices, such as PCM devices, resistive RAM (ReRAM) devices, magnetoresistive RAM (MRAM) devices, ferroelectric RAM (FeRAM) devices, STT-RAM devices, etc. It is also understood that SCM device 200 is an example of non-volatile memory devices and may be expanded to any other suitable non-volatile memory devices that include a non-volatile memory (NVM) cell array having NVM elements and access devices.

Figure 3:
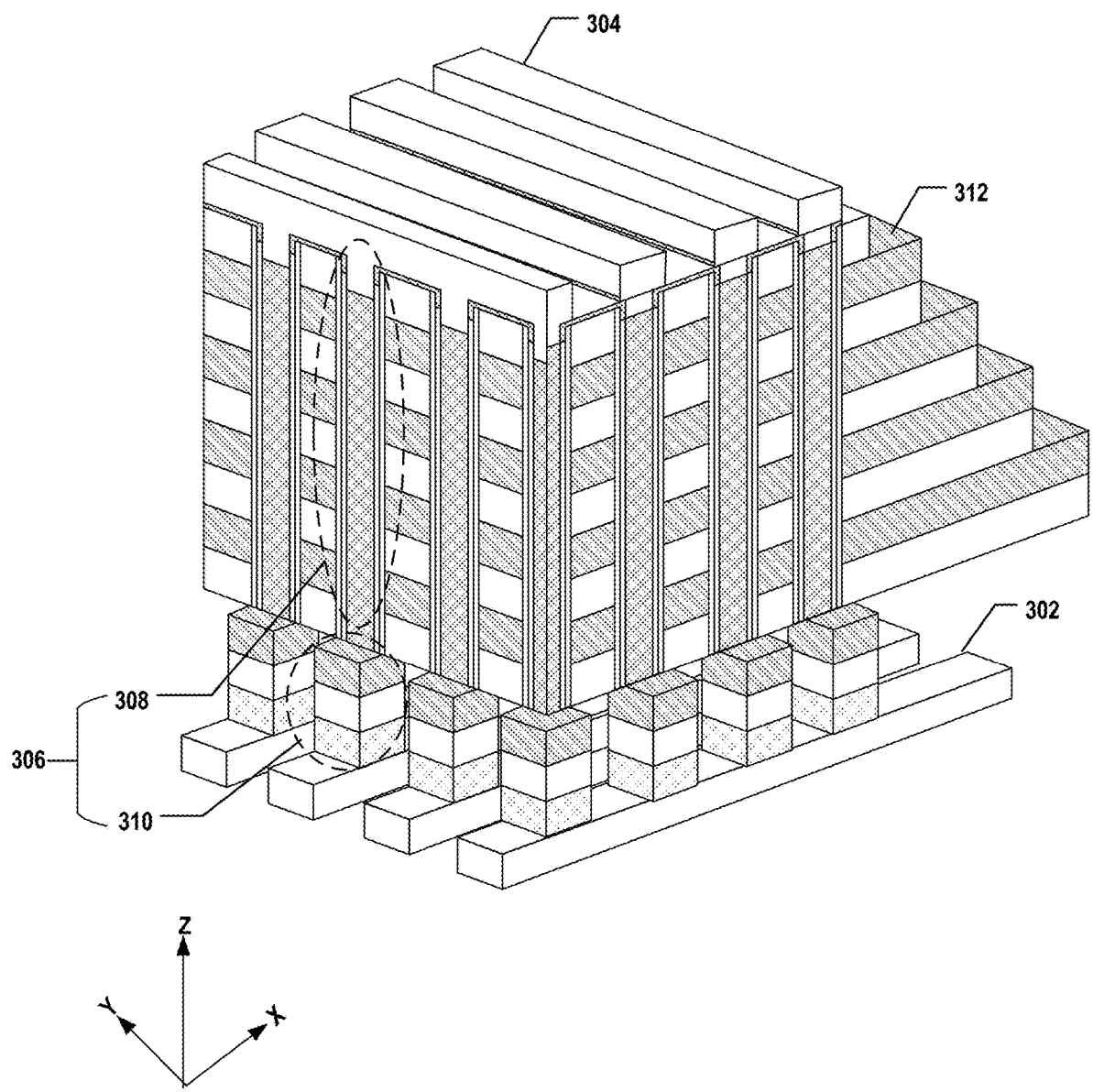
FIG. 3 illustrates a perspective view of a phase-change memory (PCM) cell array, according to some aspects of the present disclosure.

FIG. 3 illustrates a perspective view of a PCM cell array 300, according to some aspects of the present disclosure. PCM cell array 300 may be one example of SCM cell array 202 in FIG. 2. PCM cell array 300 can be formed in a three-dimensional (3D) vertical chain-cell-type architecture in which access devices 310 and PCM elements 308 forming PCM cells 306 are connected in serial and positioned at the cross points of word lines 302 and bit lines 304, as shown in FIG. 3. It is noted that x and y axes are included in FIG. 3 to illustrate two orthogonal directions in the wafer plane. The x-direction is the word line direction, and the y-direction is the bit line direction. It is noted that z-axis is also included in FIG. 3 to further illustrate the spatial relationship of the components in PCM cell array 300. The substrate (not shown) of PCM cell array 300 includes two lateral surfaces extending laterally in the x-y plane: a top surface on the front side of the wafer, and a bottom surface on the backside opposite to the front side of the wafer. The z-axis is perpendicular to both the x and y axes. As used herein, whether one component (e.g., a layer or a device) is "on," "above," or "below" another component (e.g., a layer or a device) of a semiconductor device (e.g., PCM cell array 300) is determined relative to the substrate of the semiconductor device in the z-direction (the vertical direction perpendicular to the x-y plane) when the substrate is positioned in the lowest plane of the semiconductor device in the z-direction. The same notion for describing the spatial relationships is applied throughout the present disclosure.

In some implementations, PCM cell array 300 includes parallel word lines 302 and parallel bit lines 304 in the different planes in the vertical direction. Each bit line 304 extends laterally along the bit line direction in the plan view (parallel to the wafer plane), and each word line 302 extends laterally in the word line direction in the plan view, according to some implementations. Each word line 302 thus can be perpendicular to each bit line 304.

As shown in FIG. 3, PCM cell array 300 includes a plurality of PCM cells 306 each disposed at an intersection of bit line 304 and respective word line 302, according to some implementations. Each PCM cell 306 can have a vertical pillar shape. In some implementations, each PCM cell 306 includes a PCM element 308 and an access device 310 stacked vertically. Each PCM cell 306 can store data that can be written or read by varying the voltage applied to respective access device 310. Each PCM cell 306 can be accessed individually by a current applied through the top and bottom conductors in contact with each PCM cell 306, e.g., respective word line 302 and bit line 304.

In some implementations, PCM element 308 is a chain-cell-type PCM element that includes polysilicon transistors and phase-phase layers connected in parallel. The polysilicon transistors and phase-phase layers can be formed by gate oxide, channel polysilicon, and phase-change material formed on the side of the holes of stacked gates 312. In some implementations, access device 310 is a polysilicon diode. In the write operation, an off-voltage can be applied to the selected gate 312, and a positive on-voltage can be applied to the unselected gates 312. When a set/reset pulse voltage is applied to the drain, the current can flow through the phase-change layer at the selected gates 312, and the temperature can be increased by Joule heating, causing the set/reset states. In the same way, by applying a voltage suitable for the read operation to the drain, the resistance of the phase-change layer at the selected gate 312 can be determined.

It is understood that PCM cell array 300 may be formed in any other suitable 2D or 3D architectures, such as the lateral chain-cell-type architecture or 3D cross-point (XPoint) architecture. It is also understood that PCM element 308 may include any other suitable PCM elements, such as a phase-phase layer vertically stacked between two carbon electrodes. It is further understood that access device 310 may include any other suitable access devices, such as the OTS selector.

Figure 4:
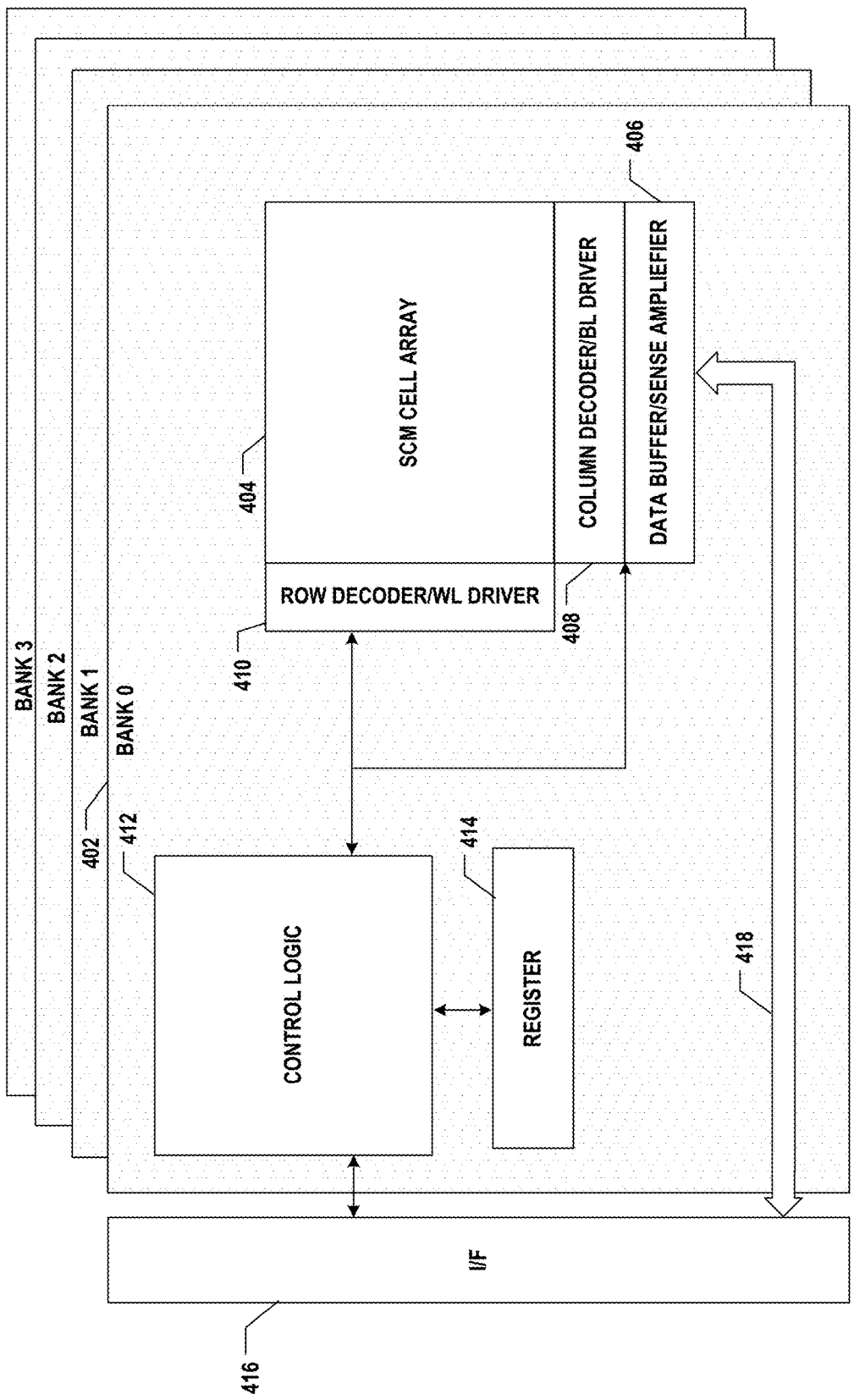
FIG. 4 illustrates a detailed diagram of an SCM device, according to some aspects of the present disclosure.

An SCM device can be divided into multiple physical modules each including an SCM cell array and peripheral circuits for the corresponding SCM cell array to enable parallel processing of the SCM device. The physical modules can be dies and/or banks. For example, FIG. 4 illustrates a detailed diagram of an SCM device 400, according to some aspects of the present disclosure. SCM device 400 may be one example of SCM device 200 in FIG. 2. As shown in FIG. 4, SCM device 400 can be divided into multiple banks 402 (e.g., 0, 1, 2, and 3) each including an SCM cell array 404. Although not shown, it is understood that in some examples, multiple banks 402 may be on the same die, and SCM device 400 may include multiple dies each including multiple banks 402.

In some implementations, each bank 402 also includes peripheral circuits for respective SCM cell array 404, including a data buffer/sense amplifier 406, a column decoder/bit line driver 408, a row decoder/word line driver 410, control logic 412, registers 414, an interface (I/F) 416, and a data bus 418. It is understood that in some examples, additional peripheral circuits not shown in FIG. 4 may be included as well, such as voltage generators, charge pumps, and any suitable types of buses.

Data buffer/sense amplifier 406 can be configured to sense (read) and program (write) data from and to SCM cell array 404 according to the control signals from control logic 412. For example, sense amplifiers may detect small voltage or current changes in SCM cell array 404 during read operations, while data buffers may temporarily store data being read from or written to SCM cell array 404.

Column decoder/bit line driver 408 can be configured to be controlled by the address signals from control logic 412 and select/deselect one or more columns of SCM cells in SCM cell array 404 by applying bit line voltages to the corresponding bit lines. Column decoder/bit line driver 408 can be further configured to drive the selected bit line(s). Row decoder/word line driver 410 can be configured to be controlled by the address signals from control logic 412 and select/deselect one or more rows of SCM cells in SCM cell array 404 by applying word line voltages to the corresponding word lines. Row decoder/word line driver 410 can be further configured to drive the selected word line(s).

Control logic 412 can be coupled to each peripheral circuit described above and configured to control the operations of each peripheral circuit. Control logic 412 can include a fixed logic unit such as a logic gate, a multiplexer, a flip-flop, a state machine, or a discrete hardware circuit performing a given logic function that is known at the time of device manufacture. In some implementations, control logic 412 is implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described herein.

Registers 414 can be coupled to control logic 412 and include status registers, command registers, and address registers for storing status information, command operation codes (OP codes), and command addresses for controlling the operations of each peripheral circuit. Interface 416 can be coupled to control logic 412 and act as a control buffer to buffer and relay control commands received from a memory controller (not shown, e.g., memory controller 106 in FIG. 1) and/or host (not shown, e.g., host 108 in FIG. 1) to control logic 412 and status information received from control logic 412 to the memory controller and/or the host. Interface 416 can also be coupled to data buffer/sense amplifier 406 via data bus 418 and act as a data input/output (I/O) interface and a data buffer to buffer and relay the data to and from SCM cell array 404.

Figure 19:
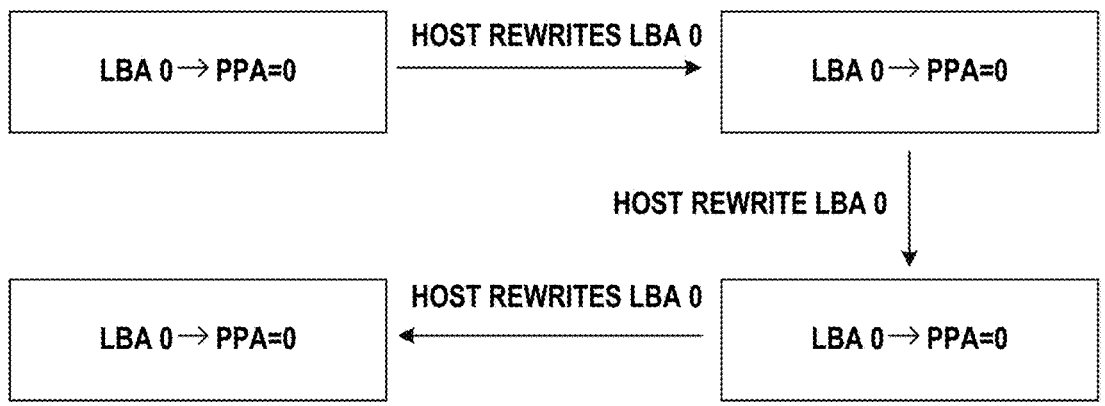
FIG. 19 illustrates a scheme for updating an L2P table used for SCM, according to some aspects of the present disclosure.

Different from NAND Flash storage products, as shown in FIG. 18, in which the same LBA is mapped to different PPAs, for SCM systems, such as PCM storage products, the same LBA is mapped to the same PPA by default because data can be rewritten on the same physical page. Different from NAND Flash memory, PCM cells do not need to be erased first before being rewritten; there is no erase operation for PCM memory. As shown in FIG. 19, when the host writes data using the same LBA (e.g., LBA 0), the data will be rewritten to the same physical page address each time (e.g., PPA=0). Since the LBAs and PPAs have a fixed relationship, the program/write cycle counts (a.k.a. write count) of physical addresses are the same as those of logical addresses known by the memory controller. Thus, the write count can be used as the indicator of the hotness of host data for SCM systems, such as PCM storage products. Consistent with the scope of the present disclosure, write count is used as a factor in the improved schemes of wear-leveling, as disclosed below in detail.

Figure 5:
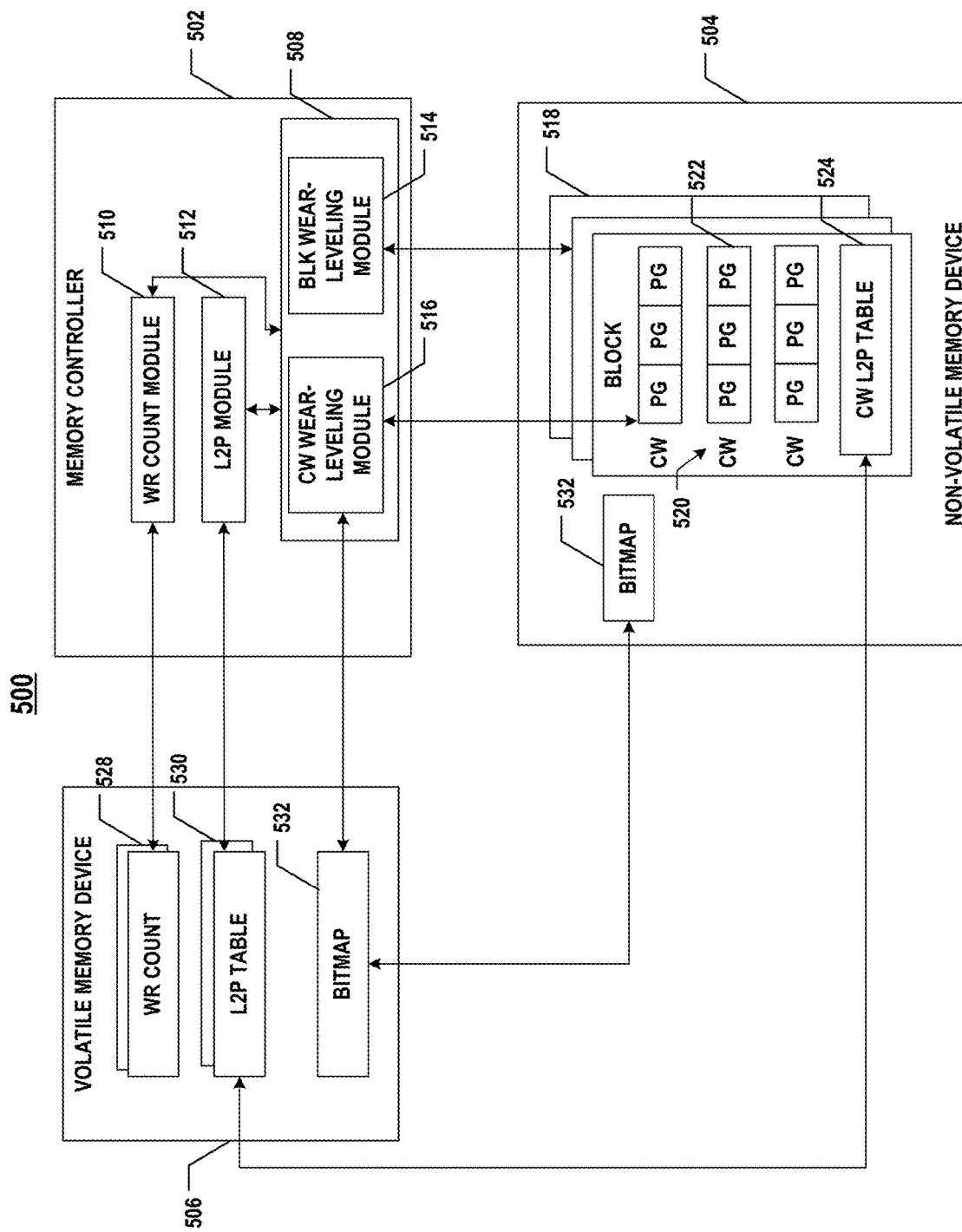
FIG. 5 illustrates a detailed diagram of a memory system including a memory controller performing two-level wear-leveling, according to some aspects of the present disclosure.

FIG. 5 illustrates a detailed diagram of a memory system 500 including a memory controller 502 performing two-level wear-leveling, according to some aspects of the present disclosure. Memory system 500 may be one example of memory system 102 in FIG. 1, and memory controller 502 may be one example of memory controller 106 in FIG. 1. Memory system 500 can also include one or more non-volatile memory devices 504 and one or more volatile memory devices 506. Non-volatile memory device(s) 504 and volatile memory device(s) 506 may be examples of memory devices 104 in FIG. 1. In some implementations, non-volatile memory device 504 includes an SCM device, such as SCM devices 200 and 400, or any SCM devices disclosed herein. In some implementations, volatile memory device 506 includes a DRAM or SRAM. It is understood that although volatile memory device 506 in FIG. 5 is shown as a standalone device separate from memory controller 502, in some examples, a part or the entirety of volatile memory device 506 may be part of memory controller 502.

As shown in FIG. 5, memory controller 502 can include a wear-leveling module 508, a write count module 510, and an L2P module 512. Each of wear-leveling module 508, write count module 510, and L2P module 512 can be implemented as a firmware module in the form of codes or instructions that can be executed by a processing unit, such as a microcontroller unit (MCU). Additionally or alternatively, each of wear-leveling module 508, write count module 510, and L2P module 512 can be implemented as ASICs, including a digital circuit, an analog circuit, and/or a mixed-signal circuit. Wear-leveling module 508 can further include two sub-modules each configured to control wear-leveling of non-volatile memory device 504 at two different levels, for example, a block wear-leveling module 514, and a codeword wear-leveling module 516. It is understood that depending on the desired granularities for managing wear-leveling, the number of sub-modules and/or the levels of each sub-module may vary in different examples.

Consistent with the scope of the present disclosure, to enable wear-leveling of non-volatile memory device 504 at different levels, the memory cells of non-volatile memory device 504 are organized in different levels, including memory groups and memory units. In some implementations, non-volatile memory device 504 includes a plurality of memory groups, and each memory group includes a plurality of memory units. In other words, the memory cells of non-volatile memory device 504 are divided into a higher level of memory groups, and the memory cells in each memory group are further divided into a lower level of memory units, according to some implementations. As shown in FIG. 5, in some implementations, each memory group corresponds to a block 518, and each memory unit corresponds to a codeword 520 including a plurality of pages 522.

Figure 6:
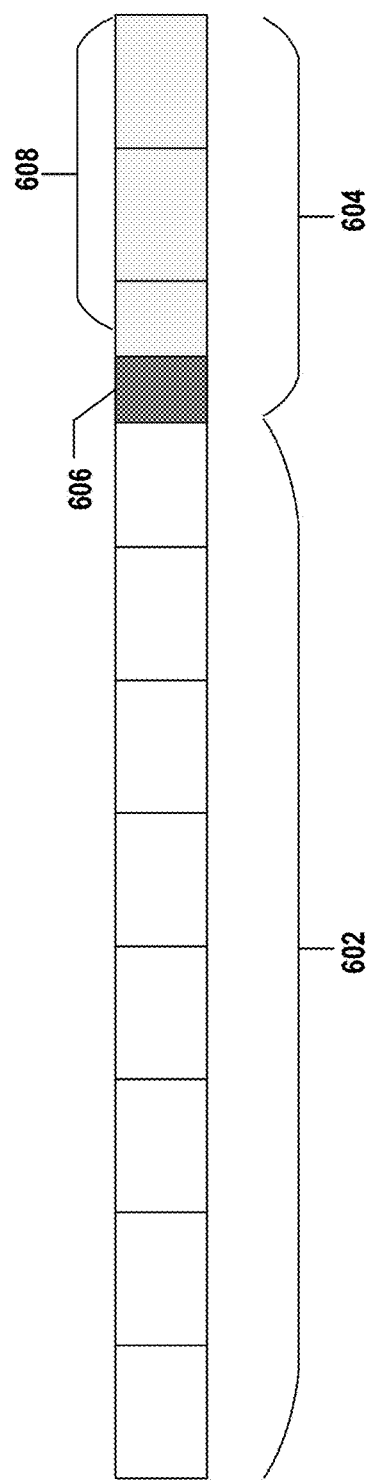
FIG. 6 illustrates a codeword, according to some aspects of the present disclosure.

Referring to FIG. 6, codeword 520 may be the one-shot operation size in memory system 500. In other words, codeword 520 may be the basic unit for performing a write operation in memory system 500. For example, the size of codeword 520 may be 512 bytes, 4,096 bytes, 16,384 bytes, etc. Codeword 520 may be a single error correction code (ECC) codeword or a combination of multiple ECC codewords. In one example, codeword 520 may be a combination of 16 ECC codewords (each having a size of 256 bytes) having a size of 4,096 bytes. As shown in FIG. 6, codeword 520 may include multiple pages of user/host data 602 and multiple pages of spare data 604. In one example, user/host data 602 of each codeword 520 may be from the pages with the same page number (e.g., page 0) of each bank (e.g., bank 0, bank 1, bank 2, and bank 3) and/or die. Each page may correspond to a set of memory cells in non-volatile memory device 504, referred to herein as a "physical page." Accordingly, codeword 520 may be referred to herein as either a "logical codeword" that is known by memory controller 502 or a "physical codeword" that corresponds to multiple physical pages (sets of memory cells) in non-volatile memory device 504. Spare data 604 may include parity data 608 for ECC and metadata 606, e.g., write count of codeword 520. For example, each time memory controller 502 controls non-volatile memory device 504 to perform a write operation on codeword 520, the word count of codeword 520 may be increased by 1. The word count of each codeword 520 thus may indicate the hotness of corresponding physical pages (sets of memory cells) in non-volatile memory device 504.

Figure 7:
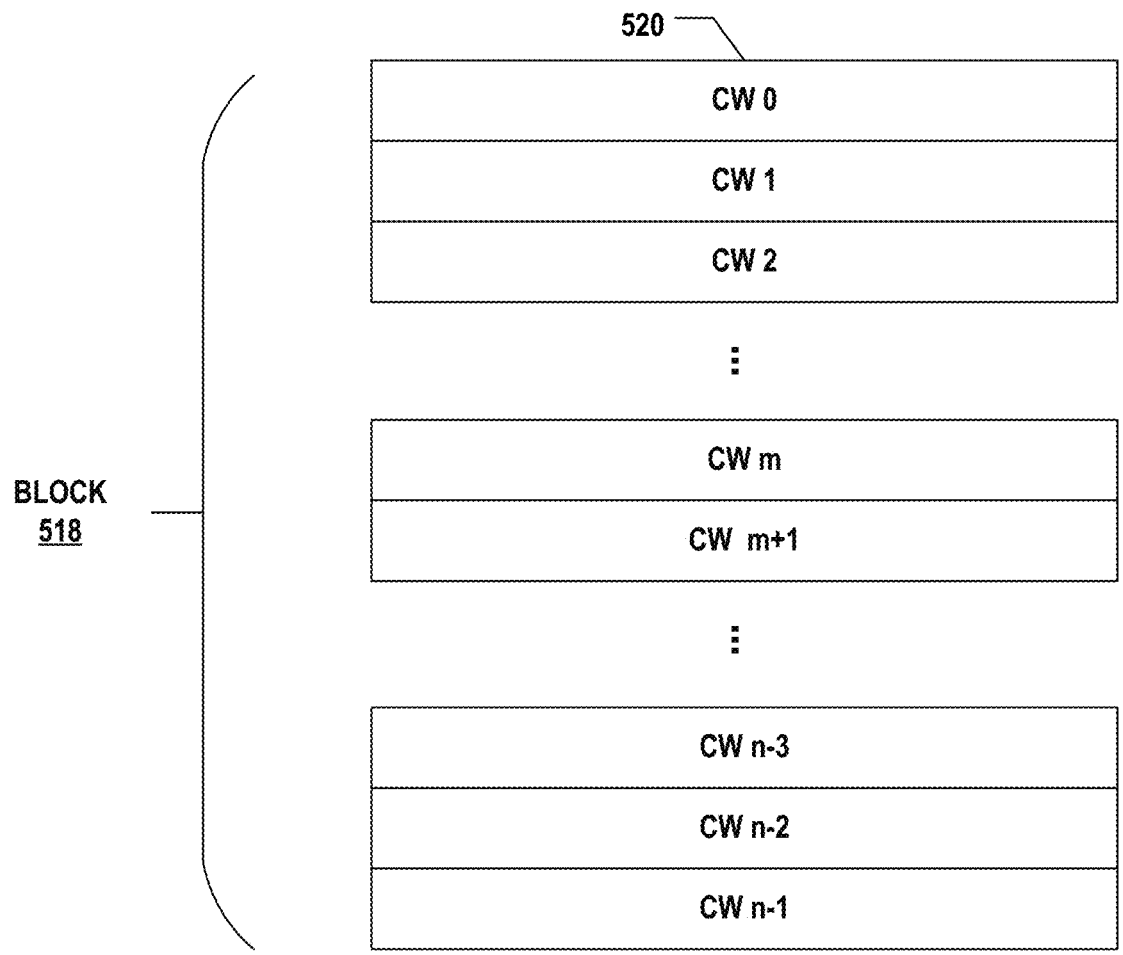
FIG. 7 illustrates a block including multiple codewords, according to some aspects of the present disclosure.

Referring to FIG. 7, block 518 may be a combination of multiple codewords 520 (e.g., n codewords). Similar to codeword 520, block 518 may be referred to herein as either a "logical block" that is known by memory controller 502 or a "physical block" that corresponds to multiple physical codewords (sets of physical pages) in non-volatile memory device 504. In one example, a physical block may include rows and/or columns of SCM cells in SCM devices. Since each codeword 520 in block 518 includes a respective word count, the hotness of codeword 520 may be indicated by the average word count of all codewords 520 in block 518. It is understood that block 518, codewords 520, and pages 522 are used as an example of possible organizations and hierarchies of memory cells in non-volatile memory device 504 for wear-leveling at different levels, and any other examples of organizations and hierarchies may be applicable to the wear-leveling schemes disclosed herein as well.

Referring back to FIG. 5, volatile memory device 506 can store a variety of data structures used for managing the wear-leveling schemes disclosed herein, including write counts 528, L2P tables 530, and a swap bitmap 532. In some implementations, write counts 528 include group write counts for memory groups (e.g., blocks 518) and unit write counts for memory units (e.g., codewords 520) within memory groups. Write count module 510 of memory controller 502 can be configured to manage write counts 528, for example, by monitoring write counts 528 and storing write counts 528 into volatile memory device 506. As described above, metadata 606 of codeword 520 can store the corresponding write count. That is, write count module 510 can be further configured to monitor a unit write count for each memory unit (e.g., memory cells corresponding to codeword 520), and store the unit write counts in non-volatile memory device 504 (e.g., in metadata 606 of codewords 520). Due to the large number of codewords 520 in non-volatile memory device 504, the size of the unit write counts for all codewords 520 may be too large to be loaded into volatile memory device 506 at the same time. Thus, in some implementations, only some of the unit write counts are loaded by write count module 510 into volatile memory device 506 as write counts 528.

As described above, the average unit write count of all memory units in a memory group can be used as the group write count for the memory group to indicate the hotness of data in the memory group. In some implementations, write count module 510 is configured to monitor a group write count for each memory group (e.g., memory cells corresponding to block 518), and store the group write counts into volatile memory device 506 directly if the number of group write counts is acceptable to volatile memory device 506. For example, for each block 518, write count module 510 may monitor the unit write count for each codeword 520 and update the average unit write count (group write count) for block 518 as the unit write count changes.

In some implementations, write count module 510 is further configured to determine the maximal write count and the minimal write count of write counts 528 at different levels. In one example, write count module 510 may determine the hottest block 518 with the maximal group write count, and the coldest block 518 with the minimal group write count. Similarly, within each block 518, write count module 510 may determine the hottest codeword 520 with the maximal unit write count, and the coldest codeword 520 with the minimal unit write count. The maximal write count and minimal write count can be used as the trigger to start wear-leveling, and used as the labels to identify blocks 518 and/or codewords 520 on which wear-leveling is performed.

In some implementations, block wear-leveling module 514 of memory controller 502 is configured to perform the block wear-leveling in response to the difference between the maximal group write count and minimal group write count being larger than a group count threshold. That is, when the group write count gap exceeds the preset threshold, block wear-leveling module 514 can start the block wear-leveling between blocks 518. In some implementations, block wear-leveling module 514 performs the block wear-leveling by swapping the hottest block 518 (having the maximal group write count) and the coldest block 518 (having the minimal group write count). Alternatively or additionally, in some implementations, codeword wear-leveling module 516 of memory controller 502 is configured to perform the codeword wear-leveling in response to the difference between the maximal unit write count and minimal unit write count being larger than a unit count threshold. That is, when the unit write count gap exceeds the preset threshold, codeword wear-leveling module 516 can start the codeword wear-leveling between codewords 520 within block 518. In some implementations, codeword wear-leveling module 516 performs the codeword wear-leveling by swapping the hottest codeword 520 (having the maximal unit write count) and the coldest codeword 520 (having the minimal unit write count).

As described above, block 518 is known by memory controller 502 as the logical block, while the block wear-leveling is performed on the physical blocks, according to some implementations. Thus, L2P tables 530 stored in volatile memory device 506 can include a group mapping table between a logical group address and a physical group address for each memory group (e.g., a block L2P table for non-volatile memory device 504). As shown in FIG. 9A, for example, the block L2P table may map each logical block address to a respective physical block address (e.g., 0 to 0, 1 to 1, . . . , N to N). L2P module 512 of memory controller 502 can be configured to maintain and manage the group mapping table and store the group mapping table into volatile memory device 506 as part of the L2P tables 530 since there is only one group mapping table for non-volatile memory device 504.

Similarly, codeword 520 is known by memory controller 502 as the logical codeword, while the codeword wear-leveling is performed on the physical codewords, according to some implementations. Thus, a unit mapping table between a logical unit address and a physical unit address for each memory unit (e.g., a codeword L2P table 524 for each block 518) can be stored in non-volatile memory device 504. As shown in FIG. 10A, for example, the codeword L2P table may map each logical codeword address to a respective physical codeword address (e.g., 0 to 0, 1 to 1, . . . , N to N). Different from the single block L2P table that can be stored and managed in volatile memory device 506 directly by L2P module 512 due to its limited size, unit mapping tables are maintained and managed by L2P module 512 in non-volatile memory device 504 due to a large number of tables for each block. For example, each codeword L2P table 524 may be stored in the respective block 518 or in a designated area of non-volatile memory device 504. When codeword wear-leveling is performed on a specific codeword 520, L2P module 512 can be configured to retrieve the corresponding codeword L2P table 524 from non-volatile memory device 504, and store it into volatile memory device 506 as part of L2P tables 530 in order to perform the codeword wear-leveling.

In some implementations, to swap the hottest block 518 (having the maximal group write count) and the coldest block 518 (having the minimal group write count), block wear-leveling module 514 is configured to swap the data in the hottest block 518 and the data in the coldest block 518, and also update the group mapping table by swapping the physical group address of the hottest block 518 and the physical group address of the coldest block 518. For example, as shown in FIG. 9B, the physical block addresses N and M may be swapped after swapping data in logical blocks M and N, indicating that blocks M and N have been swapped by block wear-leveling.

Similarly, in some implementations, to swap the hottest codeword 520 (having the maximal unit write count) and the coldest codeword 520 (having the minimal unit write count), codeword wear-leveling module 516 is configured to swap the data in the hottest codeword 520 and the data in the coldest codeword 520, and also update the corresponding unit mapping table by swapping the physical unit address of the hottest codeword 520 and the physical unit address of the coldest codeword 520. For example, as shown in FIG. 10B, the physical codeword addresses N and M may be swapped after swapping data in logical codewords M and N, indicating that codewords M and N have been swapped by codeword wear-leveling.

Referring back to FIG. 5, swap bitmap 532 can indicate a swapping index of each memory group (e.g., block 518). The swapping index can be either a default value in response to no codeword wear-leveling process being performed in the corresponding memory group, or a swapping value in response to codeword wear-leveling process being performed in the corresponding memory group. For example, as shown in FIG. 11, the swapping indices of blocks 0, 1, 2, 4, and 1023 may be the default value "0," indicating that no codeword wear-leveling process has been performed in blocks 0, 1, 2, 4, and 1023. Thus, the codeword L2P tables for blocks 0, 1, 2, 4, and 1023 may remain unchanged in their default form (e.g., as shown in FIG. 10A). In contrast, the swapping indices of blocks 3, 5, and 6 may be the swapping value "1," indicating that at least one codeword wear-leveling process being performed in blocks 3, 5, and 6. Thus, the codeword L2P tables for blocks 3, 5, and 6 may be changed (e.g., as shown in FIG. 10B).

Referring back to FIG. 5, in some implementations, codeword wear-leveling module 516 is configured to maintain and manage swap bitmap 532, and store swap bitmap 532 in non-volatile memory device 504. Codeword wear-leveling module 516 can also be configured to retrieve swap bitmap 532 from non-volatile memory device 504, and store it into volatile memory device 506, for example, during the initialization of memory system 500. In some implementations, wear-leveling module 508 is configured to check swap bitmap 532 stored in volatile memory device 506 to determine whether a codeword L2P table 524 needs to be loaded from non-volatile memory device 504 into volatile memory device 506 based on the swapping index of the corresponding block 518 in swap bitmap 532.

Figure 8:
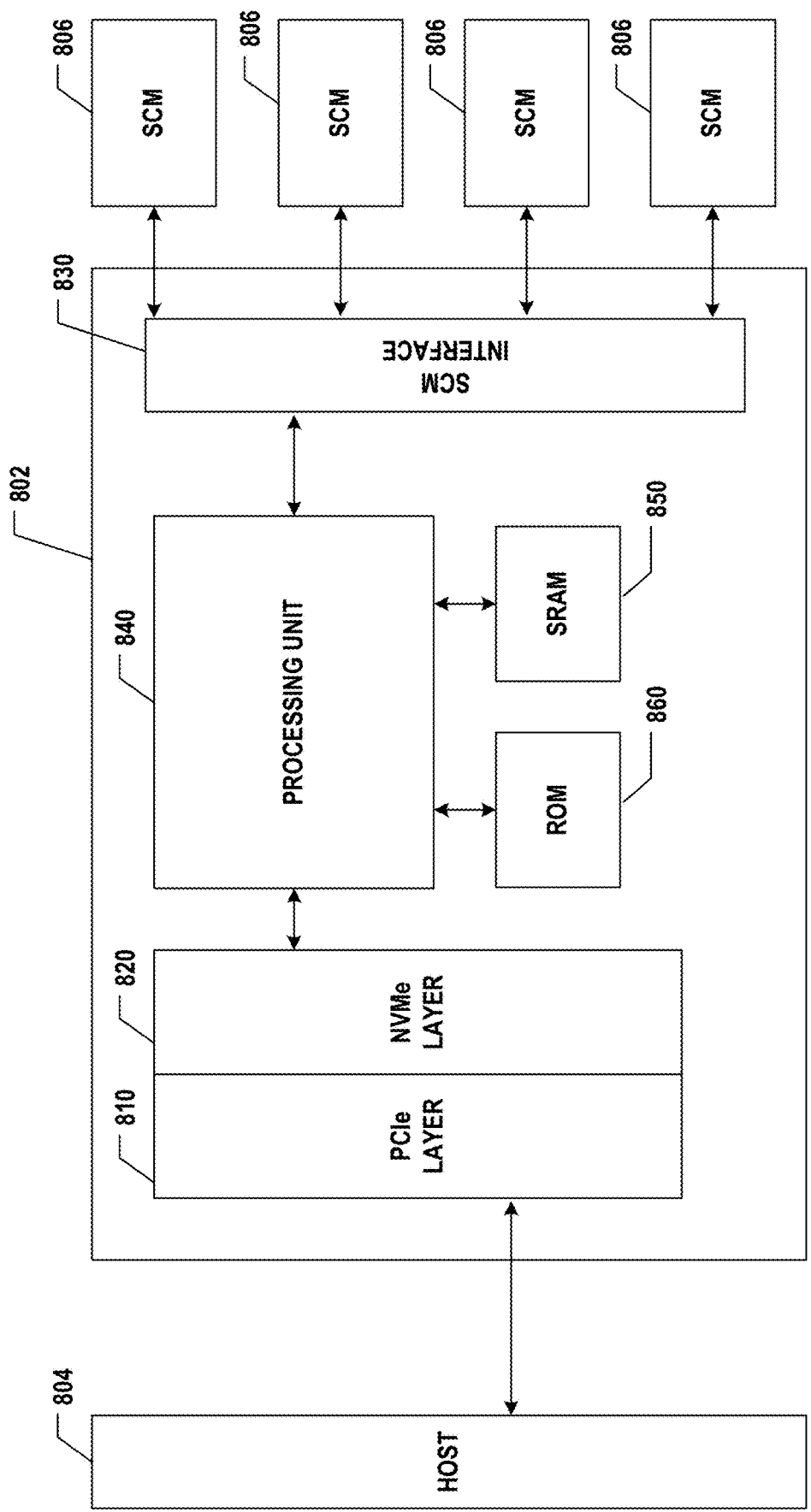
FIG. 8 illustrates a detailed diagram of a memory controller, according to some aspects of the present disclosure.

FIG. 8 illustrates a detailed diagram of a memory controller 802, according to some aspects of the present disclosure. Memory controller 802 may be one example of memory controller 502 in FIG. 5. As shown in FIG. 8, memory controller 802 can include a processing unit 840, an SRAM 850, and a read-only memory (ROM) 860. In some implementations, processing unit 840 includes one or more MCUs. The various firmware modules in memory controller 502 described above with respect to FIG. 5 can be implemented as firmware codes or instructions stored in ROM 860 and executed by processing unit 840. In some implementations, the various data structures in volatile memory device 506 can be stored in SRAM 850. In some implementations, memory controller 802 also includes an SCM interface 830 coupled to SCM devices 806 (e.g., examples of memory devices 104 in FIG. 1) configured to transfer data, command, clock, or any suitable signals between SCM devices 806 and processing unit 840. In some implementations, memory controller 802 further includes various I/O layers to enable various communication protocols facilitating data transfer, communication, and management between a host 804 (e.g., one example of host 108 in FIG. 1) and memory controller 802, including, for example, a PCIe layer 810 and an NVMe layer 820.

Figure 12:
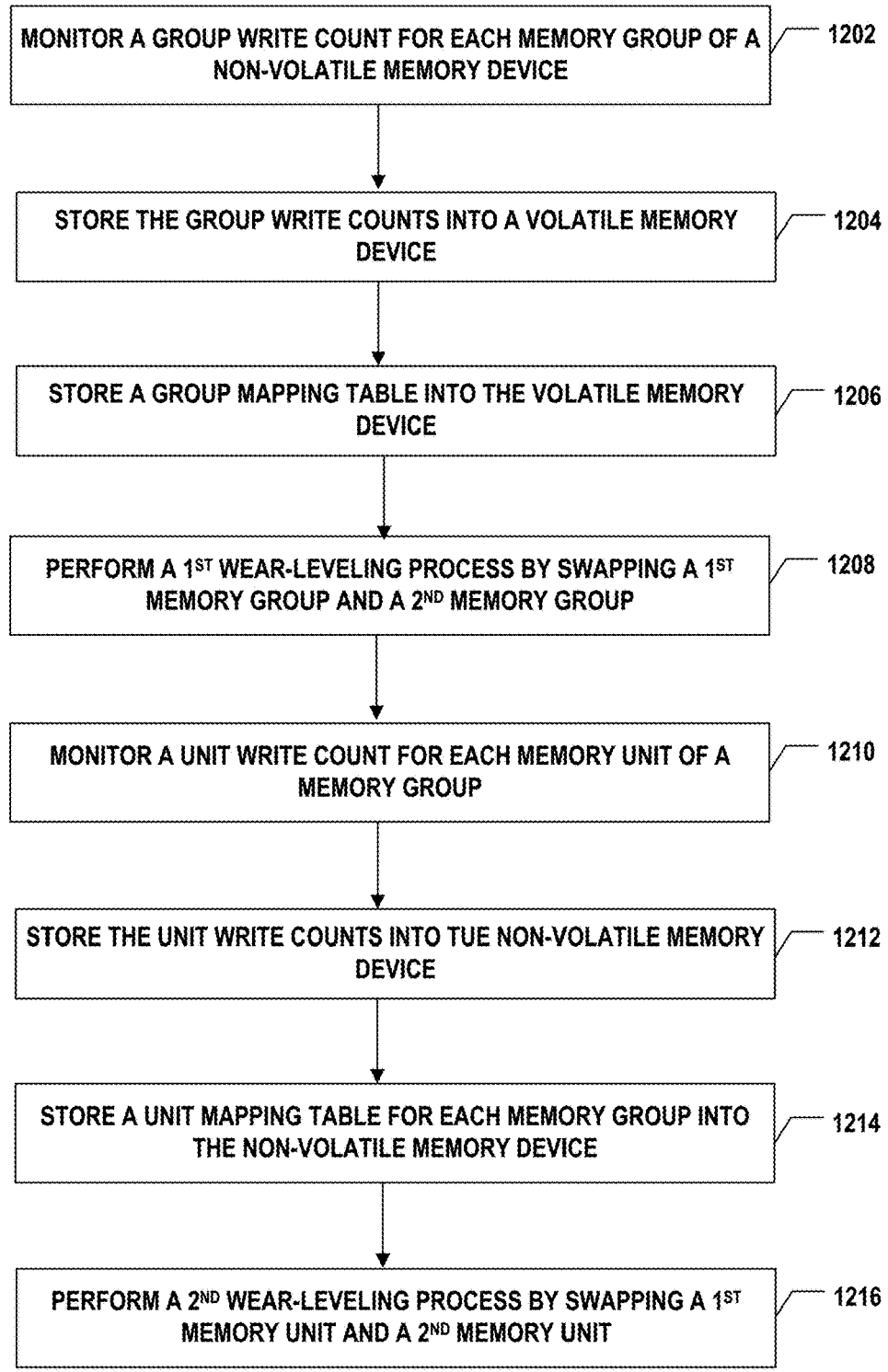
FIG. 12 illustrates a flowchart of a method for operating a non-volatile memory device, according to some aspects of the present disclosure.

FIG. 12 illustrates a flowchart of a method 1200 for operating a non-volatile memory device, according to some aspects of the present disclosure. The non-volatile memory device may be any suitable memory device disclosed herein, such as non-volatile memory device 504. Method 1200 may be implemented by a memory controller, such as memory controller 502, or any other suitable memory controller disclosed herein. It is understood that the operations shown in method 1200 may not be exhaustive and that other operations can be performed as well before, after, or between any of the illustrated operations. Further, some of the operations may be performed simultaneously, or in a different order than shown in FIG. 12. Still further, some of the operations shown in FIG. 12 may not be performed.

The non-volatile memory device can include a plurality of memory groups, and each of the memory groups can include a plurality of memory units. In some implementations, each of the memory units corresponds to a codeword, and each of the memory groups corresponds to a block including a plurality of codewords. For example, as shown in FIG. 5, each memory unit may correspond to a codeword 520, and each memory group may correspond to a block 518.

Referring to FIG. 12, method 1200 starts at operation 1202, in which a group write count for each memory group of the non-volatile memory device is monitored. In some implementations, the group write count for each memory group of the non-volatile memory device is an average unit write count of the memory units in the memory group. For example, as shown in FIG. 5, write count module 510 of memory controller 502 may monitor a block write count for each block 518. The block write count may be the average of all the codeword write counts of each codeword 520 in the respective block 518.

Method 1200 proceeds to operation 1204, as illustrated in FIG. 12, in which the group write counts are stored into a volatile memory device. For example, as shown in FIG. 5, write count module 510 may store the block write counts of blocks 518 into volatile memory device 506 as parts of write counts 528.

Method 1200 proceeds to operation 1206, as illustrated in FIG. 12, in which a group mapping table between a logical group address and a physical group address of each memory group is stored into the volatile memory device. In some implementations, for each memory group, the logical group address and the physical group address are the same before a first wear-leveling process. For example, as shown in FIG. 5, L2P module 512 of memory controller 502 may store a block L2P table into volatile memory device 506 as part of L2P tables 530. For example, as shown in FIG. 9A, the block L2P table may map a logical block address and a physical block address for each block 518. Before block wear-leveling, the logical block address and the physical block address may be the same for each block 518 (e.g., 0 to 0, 1 to 1, . . . , N to N).

Method 1200 proceeds to operation 1208, as illustrated in FIG. 12, in which a first wear-leveling process is performed by swapping a first memory group of the memory groups and a second memory group of the memory groups based on a first group write count for the first memory group and a second group write count for the second memory group. For example, as shown in FIG. 5, block wear-leveling module 514 may perform the block wear-leveling by swapping the hottest block 518 and the coldest block 518 in non-volatile memory device 504 based on the block write count for each block 518.

Figure 13:
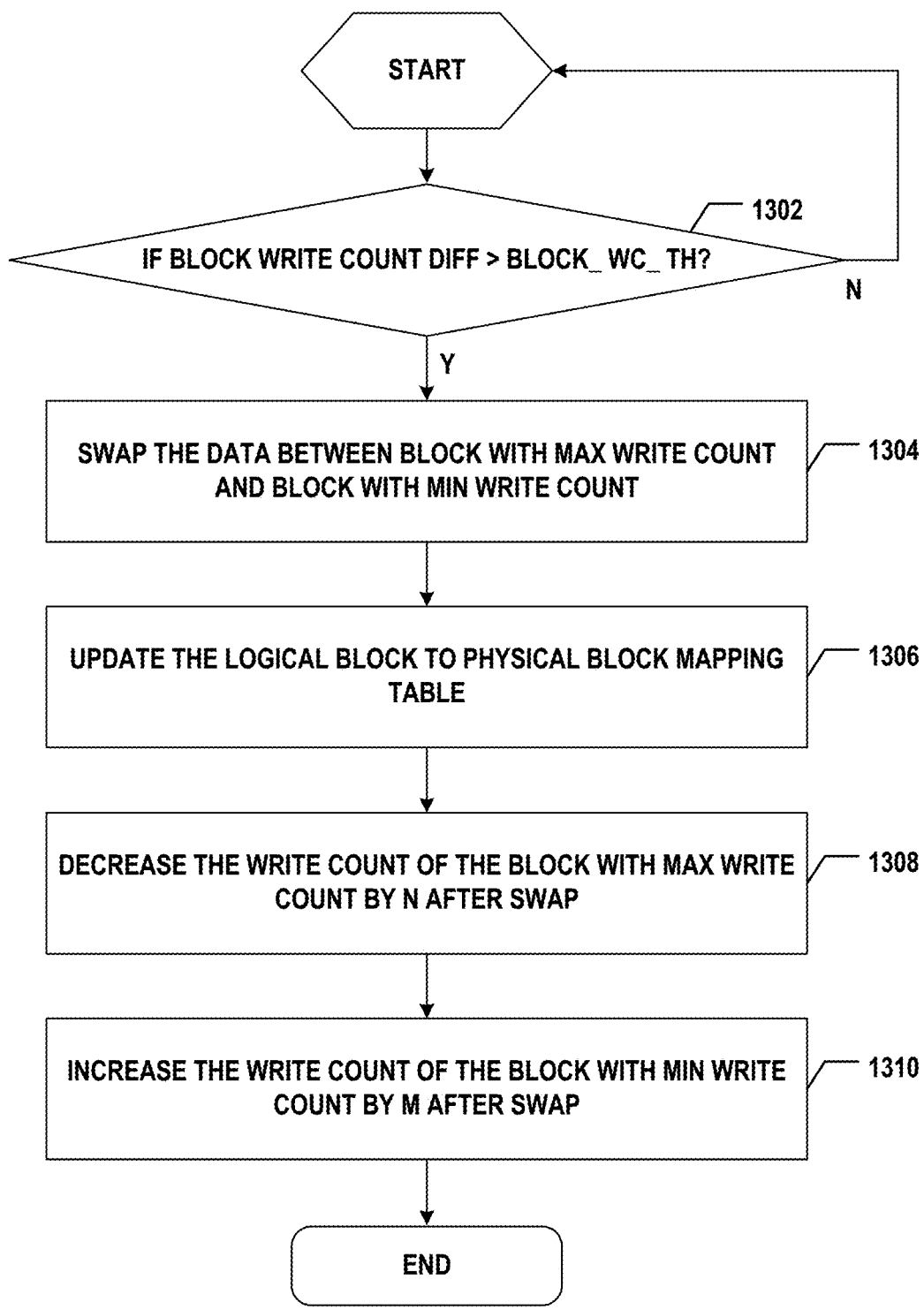
FIG. 13 illustrates a flowchart of a method for performing block-level wear-leveling according to some aspects of the present disclosure.

In some implementations, the first group write count of the group write counts for the first memory group is a maximal group write count of the group write counts, and the second group write count of the group write counts for the second memory group is a minimal group write count of the group write counts. In some implementations, the first wear-leveling process is performed in response to a difference between the first group write count and the second group write count being larger than a group count threshold. For example, as shown in FIG. 13, at operation 1302, the block write count difference is compared with the preset block write count threshold (block_wc_th) to determine whether the block write count difference is larger than the block write count threshold. The block write count difference may be the difference between the maximal block write count and the minimal block write count of all blocks 518 in non-volatile memory device 504.

In some implementations, to swap the first and second memory groups, data of the first memory group and data of the second memory group are swapped, and a first physical group address of the first memory group and a second physical group address of the second memory group are swapped. For example, as shown in FIG. 13, when the answer to operation 1302 is yes, the block wear-leveling is performed between the hottest block 518 with the maximal block write count and the coldest block 518 with the minimal block write count. At operation 1304, the data between the block with the maximal block write count and the block with the minimal block write count is swapped. At operation 1306, the logical block to physical block mapping table is updated. For example, as shown in FIG. 9B, the physical block addresses M and N may be swapped after the data between physical blocks M and N is swapped.

In some implementations, the group mapping table is updated after the first wear-leveling process by swapping the first physical group address of the first memory group and the second physical group address of the second memory group. In some implementations, the first group write count for the first memory group is decreased by a preset value after the first wear-leveling process, and the second group write count for the second memory group is increased by a preset value after the first wear-leveling process. That is, a mandatory cooling operation can be performed after the wear-leveling process to avoid the first memory group with the maximal group write count to be selected again immediately after the wear-leveling process, for example, by decreasing the first group write count for the first memory group by a preset value. Similarly, a heating operation can be performed after the wear-leveling process to increase the chance that the second memory group with the minimal group write count be selected after the wear-leveling process, for example, by increasing the second group write count for the second memory group by a preset value. For example, as shown in FIG. 13, at operation 1308, the block write count of the block with the maximal block write count is increased by a preset value N after swapping. N may be 1 or 2 in some examples. At operation 1310, the block write count of the block with the minimal block write count is increased by a preset value M after swapping. M may be 1 in some examples.

Referring back to FIG. 12, method 1200 proceeds to operation 1210, in which a unit write count for each memory unit of a memory group is monitored. For example, as shown in FIG. 5, write count module 510 of memory controller 502 may monitor a unit write count for each codeword 520 in block 518.

Method 1200 proceeds to operation 1212, as illustrated in FIG. 12, in which the unit write counts are stored into the non-volatile memory device. For example, as shown in FIG. 5, write count module 510 may store the unit write counts of codewords 520 into non-volatile memory device 504. For example, as shown in FIG. 6, each unit write count may be saved as part of metadata 606 in respective codeword 520.

Method 1200 proceeds to operation 1214, as illustrated in FIG. 12, in which, for each memory group, a unit mapping table between a logical unit address and a physical unit address of each memory unit in the memory group is stored into the non-volatile memory device. In some implementations, for each memory unit, the logical unit address and the physical unit address are the same before a second wear-leveling process. For example, as shown in FIG. 5, L2P module 512 of memory controller 502 may store each codeword L2P table 524 into non-volatile memory device 504, for example, in respective block 518. For example, as shown in FIG. 10A, the codeword L2P table may map a logical codeword address and a physical codeword address for each codeword 520 in block 518. Before codeword wear-leveling, the logical codeword address and the physical codeword address may be the same for each codeword 520 (e.g., 0 to 0, 1 to 1, . . . , N to N).

Method 1200 proceeds to operation 1216, as illustrated in FIG. 12, in which a second wear-leveling process is performed by swapping a first memory unit of the memory units and a second memory unit of the memory units based on a first unit write count for the first memory unit and a second unit write count for the second memory unit. For example, as shown in FIG. 5, codeword wear-leveling module 516 may perform the codeword wear-leveling by swapping the hottest codeword 520 and the coldest codeword 520 in block 518 based on the codeword write count for each codeword 520 in block 518.

Figure 14:
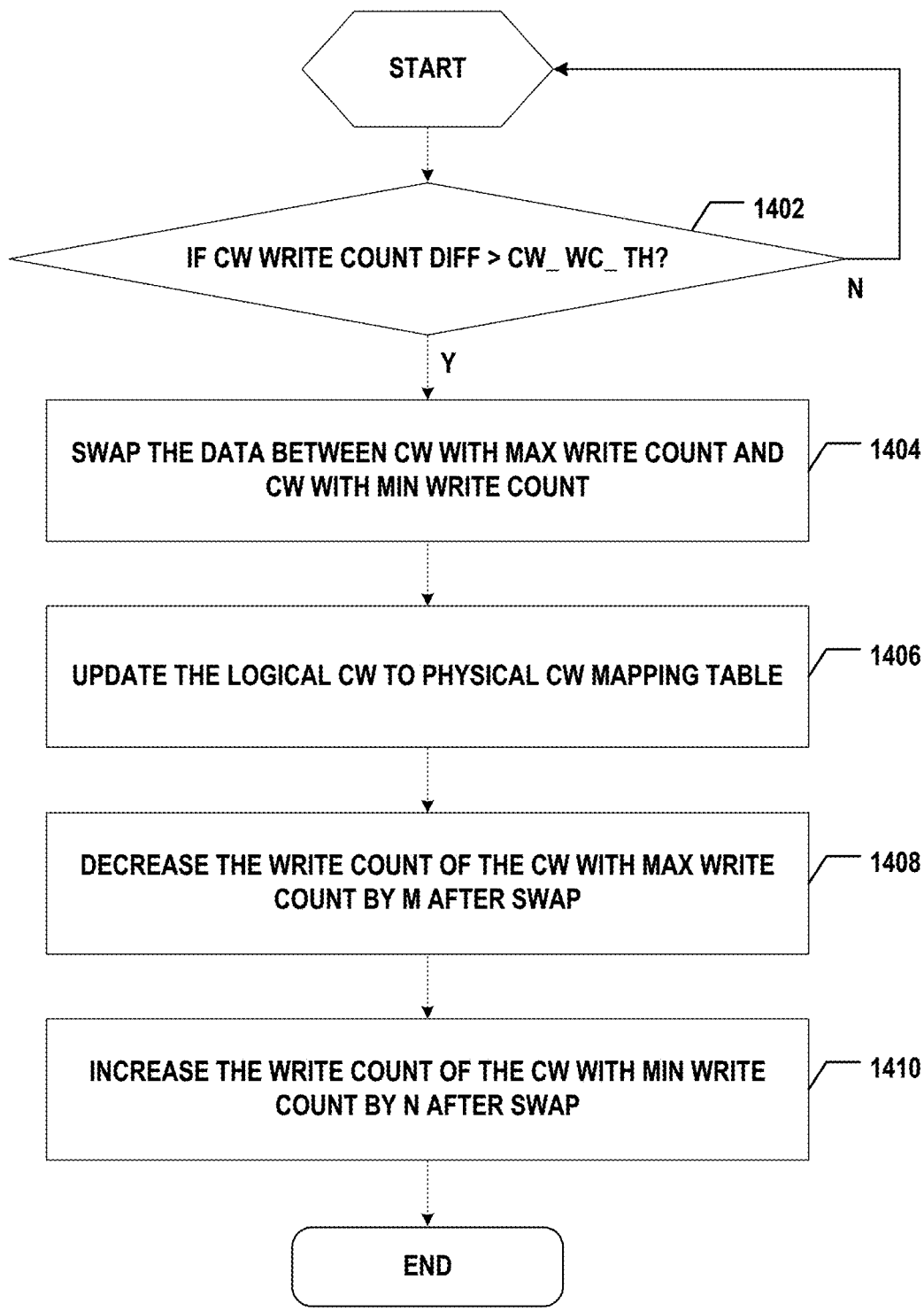
FIG. 14 illustrates a flowchart of a method for performing codeword-level wear-leveling according to some aspects of the present disclosure.

In some implementations, the first unit write count of the unit write counts for the first memory unit is a maximal unit write count of the unit write counts, and the second unit write count of the unit write counts for the second memory unit is a minimal unit write count of the unit write counts. In some implementations, the second wear-leveling process is performed in response to a difference between the first unit write count and the second unit write count being larger than a unit count threshold. For example, as shown in FIG. 14, at operation 1402, the codeword write count difference is compared with the preset codeword write count threshold (cw_wc_th) to determine whether the codeword write count difference is larger than the codeword write count threshold. The codeword write count difference may be the difference between the maximal codeword write count and the minimal codeword write count of all codewords 520 in block 518.

In some implementations, to swap the first and second memory units, data of the first memory unit and data of the second memory unit are swapped, and a first physical unit address of the first memory unit and a second physical unit address of the second memory unit are swapped. For example, as shown in FIG. 14, when the answer to operation 1402 is yes, the codeword wear-leveling is performed between the hottest codeword 520 with the maximal codeword write count and the coldest codeword 520 with the minimal codeword write count. At operation 1404, the data between the codeword with the maximal codeword write count and the codeword with the minimal codeword write count is swapped. At operation 1406, the logical codeword to physical codeword mapping table is updated. For example, as shown in FIG. 10B, the physical codeword addresses M and N may be swapped after the data between physical codewords M and N is swapped.

In some implementations, the unit mapping table is updated after the second wear-leveling process by swapping the first unit group address of the first memory unit and the second physical unit address of the second memory unit. In some implementations, the first unit write count for the first memory unit is decreased by a preset value after the second wear-leveling process, and the second unit write count for the second memory unit is increased by a preset value after the second wear-leveling process. That is, a mandatory cooling operation can be performed after the wear-leveling process to avoid the first memory unit with the maximal unit write count be selected again immediately after the wear-leveling process, for example, by decreasing the first unit write count for the first memory unit by a preset value. Similarly, a heating operation can be performed after the wear-leveling process to increase the chance that the second memory unit with the minimal unit write count is selected after the wear-leveling process, for example, by increasing the second unit write count for the second memory unit by a preset value. For example, as shown in FIG. 14, at operation 1408, the codeword write count of the codeword with the maximal codeword write count is increased by a preset value N after swapping. N may be 1 or 2 in some examples. At operation 1410, the codeword write count of the codeword with the minimal codeword write count is increased by a preset value M after swapping. M may be 1 in some examples.

It is understood that operations 1202-1208 and operations 1210-1216 may be performed independently. In other words, the first wear-leveling process and the second wear-leveling process are two separate processes that do not depend on one another. In one example, the codeword wear-leveling process may not need to be performed in the hottest block or the coldest block on which block wear-leveling process is performed, and may be performed in any block as long as the trigger condition is met (e.g., the codeword write count difference is larger than the codeword write count threshold). In another example, only the codeword wear-leveling process or only the block wear-leveling process may be performed. In still another example, codeword wear-leveling process and block wear-leveling process may be performed in any sequence or in parallel.

In some implementations, a swap bitmap is stored into the volatile memory device. The swap bitmap can indicate a swapping index of each memory group of the non-volatile memory device. In some implementations, the swapping index of the memory group is a default value in response to no second wear-leveling process being performed for the first and second memory units in the memory group, and the swapping index of the memory group is a swapping value in response to the second wear-leveling process being performed for the first and second memory units in the memory group. For example, as shown in FIG. 5, codeword wear-leveling module 516 may store swap bitmap 532 in volatile memory device 506 during the initialization of memory system 500. For example, as shown in FIG. 12, bitmap 532 may indicate the value of the swapping index for each block being the default value "0" or swapping value "1," depending on whether codeword wear-leveling is performed in the respective block.

In some implementations, in response to the swapping index of the memory group being the swapping value, the unit mapping table of the memory group is retrieved from the non-volatile memory device, and the unit mapping table is stored into the volatile memory device. For example, as shown in FIG. 5, L2P module 512 may load codeword L2P table 524 for block 518 from non-volatile memory device 504 to volatile memory device 506 only when the swapping index of the respective block 518 in swap bitmap 532 being the swapping value "1." Otherwise, since there is no codeword wear-leveling process performed on block 518, the logical codeword address and physical codeword address remain the same for each codeword 520 in block 518; no codeword L2P table 524 become needed for performing write and read operations.

Figure 15:
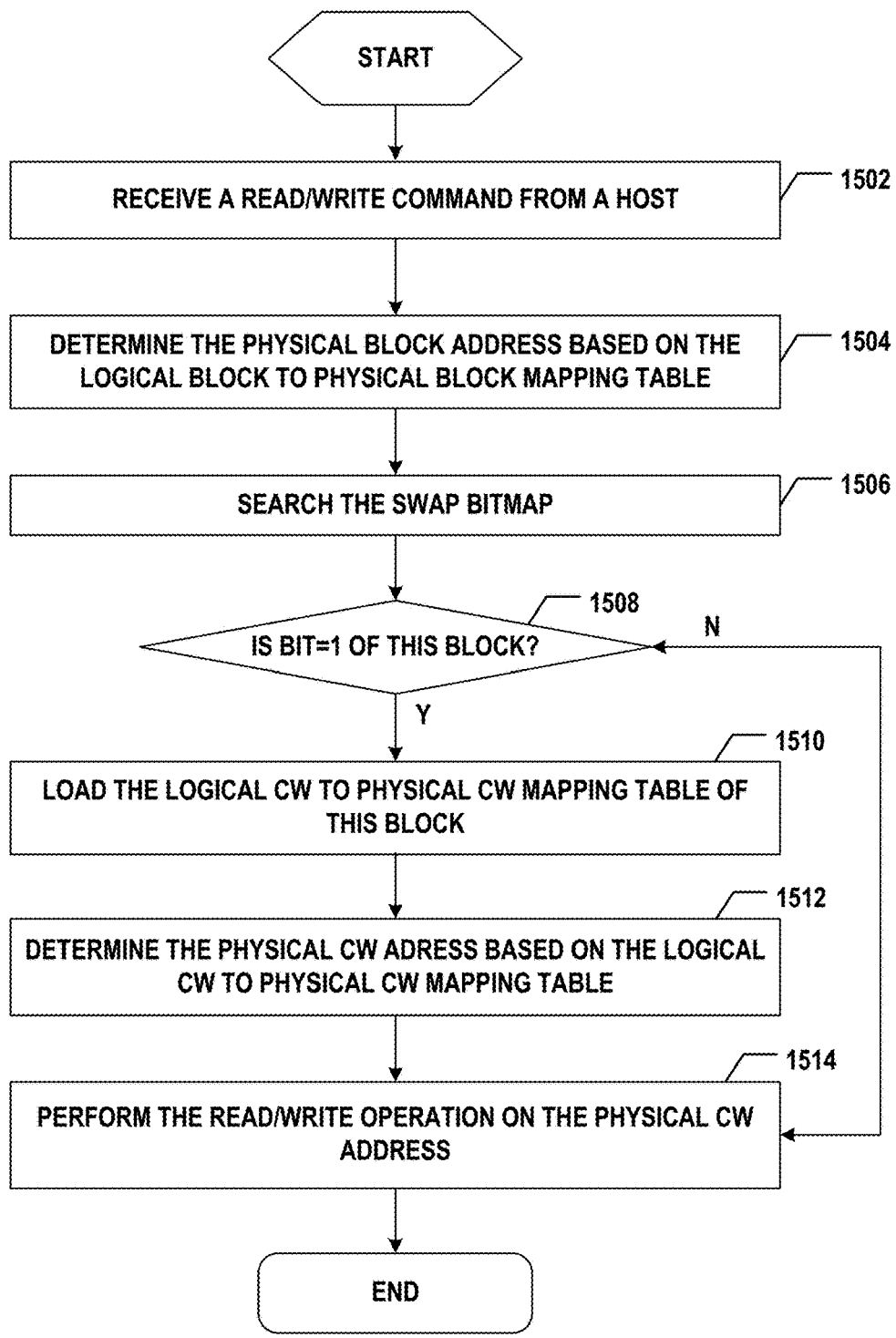
FIG. 15 illustrates a flowchart of a method for performing a read/write operation, according to some aspects of the present disclosure.

FIG. 15 illustrates a flowchart of a method for performing a read/write operation, according to some aspects of the present disclosure. Method 1500 may be implemented by a memory controller, such memory controller 502, or any other suitable memory controller disclosed herein. It is understood that the operations shown in method 1500 may not be exhaustive and that other operations can be performed as well before, after, or between any of the illustrated operations. Further, some of the operations may be performed simultaneously, or in a different order than shown in FIG. 15. Still further, some of the operations shown in FIG. 15 may not be performed.

Referring to FIG. 15, method 1500 starts at operation 1502, in which a read/write command is received from a host. The read/write command can be associated with a logical codeword and block addresses indicating the logical codeword on which the read/write operation is to be performed. At operation 1504, the physical block address is determined from the logical block address based on a logical block to physical block mapping table. At operation 1506, the swap bitmap is searched to determine the value of the swapping index of the determined physical block address (this block). At operation 1508, whether the swapping index (bit) is equal to the swapping value "1" or not is determined. If the answer to operation 1508 is yes, at operation 1510, the logical codeword to physical codeword mapping table of this block is loaded from the non-volatile memory device to the volatile memory device. At operation 1512, the physical codeword address is determined from the logical codeword address based on the logical codeword to physical codeword mapping table. At operation 1514, the read/write operation is performed on the physical codeword identified by the physical codeword address. If the answer to operation 1508 is not, operations 1510 and 1512 may be skipped as the physical codeword address is the same as the logical codeword address, and the logical codeword to physical codeword mapping table does not need to be loaded to determine the physical codeword address.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a memory controller, such as memory controller 502 in FIG. 5. By way of example, and not limitation, such computer-readable media can include RAM, ROM, electrically erasable programmable ROM (EEPROM), compact disc read-only memory (CD-ROM) or other optical disk storage, hard disk drive (HDD), such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

Although specific configurations and arrangements are discussed, it should be understood that this is done for illustrative purposes only. As such, other configurations and arrangements can be used without departing from the scope of the present disclosure. Also, the subject matter as described in the present disclosure can also be used in a variety of other applications. Functional and structural features as described in the present disclosures can be combined, adjusted, modified, and rearranged with one another and in ways that are consistent with the scope of the present disclosure.

What is claimed is:

1. A memory system, comprising
a volatile memory device;
a non-volatile memory device comprising a plurality of memory groups, each of the memory groups comprising a plurality of memory units; and
a memory controller coupled to the non-volatile memory device and configured to monitor a group write count for each memory group of the non-volatile memory device and store a group write counts into the volatile memory device, and further configured to perform at least one of:
a first wear-leveling process by swapping a first memory group of the memory groups and a second memory group of the memory groups based on a first group write count for the first memory group and a second group write count for the second memory group, wherein the first group write count of the group write counts for the first memory group is a maximal group write count of the group write counts; or
a second wear-leveling process by swapping a first memory unit of the memory units and a second memory unit of the memory units based on a first unit write count for the first memory unit and a second unit write count for the second memory unit, wherein the second group write count of the group write counts for the second memory group is a minimal group write count of the group write counts.

2. The memory system of claim 1, wherein each of the memory units corresponds to a codeword.

3. The memory system of claim 1, wherein the memory controller is configured to swap the first memory group and the second memory group by:
swapping data of the first memory group and data of the second memory group; and
swapping a first physical group address of the first memory group and a second physical group address of the second memory group.

4. The memory system of claim 1, wherein the memory controller is configured to swap the first memory unit and the second memory unit by:
swapping data of the first memory unit and data of the second memory unit; and
swapping a first physical unit address of the first memory unit and a second physical unit address of the second memory unit.

5. The memory system of claim 1, wherein the group write count for each memory group of the non-volatile memory device is an average unit write count of the memory units in the memory group.

6. The memory system of claim 1, wherein the memory controller is configured to perform the first wear-leveling process in response to a difference between the first group write count and the second group write count being larger than a group count threshold.

7. The memory system of claim 1, wherein the memory controller is configured to:
decrease the first group write count for the first memory group by a preset value after the first wear-leveling process; and
increase the second group write count for the second memory group by a preset value after the first wear-leveling process.

8. The memory system of claim 1, wherein
the memory controller is configured to store a group mapping table between a logical group address and a physical group address of each memory group into the volatile memory device; and
for each memory group, the logical group address and the physical group address are the same before the first wear-leveling process.

9. The memory system of claim 8, wherein the memory controller is configured to update the group mapping table after the first wear-leveling process by swapping a first physical group address of the first memory group and a second physical group address of the second memory group.

10. The memory system of claim 4, wherein the memory controller is configured to:
monitor a unit write count for each memory unit of the non-volatile memory device; and
store the unit write counts into the non-volatile memory device,
the first unit write count of the unit write counts for the first memory unit being a maximal unit write count of the unit write counts, and the second unit write count of the unit write counts for the second memory unit being a minimal unit write count of the unit write counts.

11. The memory system of claim 10, wherein the memory controller is configured to perform the second wear-leveling process in response to a difference between the first unit write count and the second unit write count being larger than a unit count threshold.

12. The memory system of claim 10, wherein the memory controller is configured to:
   decrease the first unit write count for the first memory unit by a preset value after the second wear-leveling process; and
   increase the second unit write count for the second memory unit by a preset value after the second wear-leveling process.

13. The memory system of claim 10, wherein
   the memory controller is configured to, for each memory group, store a unit mapping table between a logical unit address and a physical unit address of each memory unit in the memory group into the non-volatile memory device; and
   for each memory unit, the logical unit address and the physical unit address are the same before the second wear-leveling process.

14. The memory system of claim 13, wherein the memory controller is configured to update the unit mapping table after the second wear-leveling process by swapping the first physical unit address of the first memory unit and the second physical unit address of the second memory unit.

15. The memory system of claim 13, wherein the memory controller is further configured to store a swap bitmap into the volatile memory device, the swap bitmap indicating a swapping index of each memory group of the non-volatile memory device.

16. The memory system of claim 15, wherein
   the swapping index of the memory group is a default value in response to no second wear-leveling process being performed for the first and second memory units in the memory group; and
   the swapping index of the memory group is a swapping value in response to the second wear-leveling process being performed for the first and second memory units in the memory group.

17. The memory system of claim 16, wherein the memory controller is configured to:
   in response to the swapping index of the memory group being the swapping value, retrieve the unit mapping table of the memory group from the non-volatile memory device; and
   store the unit mapping table into the volatile memory device.

18. A method for operating a non-volatile memory device comprising a plurality of memory groups, each of the memory groups comprising a plurality of memory units, the method comprising:
   monitoring a group write count for each memory group of the non-volatile memory device and store the group write counts into the volatile memory device; and
   performing at least one of (i) a first wear-leveling process by swapping a first memory group of the memory groups and a second memory group of the memory groups based on a first group write count for the first memory group and a second group write count for the second memory group, wherein the first group write count of the group write counts for the first memory group is a maximal group write count of the group write counts or (ii) a second wear-leveling process by swapping a first memory unit of the memory units and a second memory unit of the memory units based on a first unit write count for the first memory unit and a second unit write count for the second memory unit, wherein the second group write count of the group write counts for the second memory group is a minimal group write count of the group write counts.

19. A non-transitory computer-readable storage medium comprising instructions that, when executed by a memory controller, cause the memory controller to:
   monitor a group write count for each memory group of a non-volatile memory device and store the group write counts into the volatile memory device; and
   perform at least one of (i) a first wear-leveling process by swapping a first memory group of a non-volatile memory device and a second memory group of the non-volatile memory device based on a first group write count for the first memory group and a second group write count for the second memory group, each of the first and second memory groups comprising a plurality of memory units, wherein the first group write count of the group write counts for the first memory group being a maximal group write count of the group write counts or (ii) a second wear-leveling process by swapping a first memory unit of the memory units and a second memory unit of the memory units based on a first unit write count for the first memory unit and a second group write count for the second memory unit, wherein the second group write count of the group write counts for the second memory group is a minimal group write count of the group write counts.

* * * * *